United States Patent
Bayesteh et al.

(10) Patent No.: US 8,811,552 B2
(45) Date of Patent: Aug. 19, 2014

(54) DOWNLINK MULTI-USER INTERFERENCE ALIGNMENT SCHEME

(71) Applicant: Research In Motion Limited, Waterloo (CA)

(72) Inventors: Alireza Bayesteh, Waterloo (CA); Amin Mobasher, Waterloo (CA); Yongkang Jia, Ottawa (CA)

(73) Assignee: Blackberry Limited, Waterloo, Ontario (CA)

( * ) Notice: Subject to any disclaimer, the term of this patent is extended or adjusted under 35 U.S.C. 154(b) by 21 days.

(21) Appl. No.: 13/798,548

(22) Filed: Mar. 13, 2013

(65) Prior Publication Data

US 2014/0098900 A1   Apr. 10, 2014

Related U.S. Application Data

(63) Continuation of application No. PCT/IB2011/050426, filed on Feb. 1, 2011.

(51) Int. Cl.
| | | |
|---|---|---|
| H04L 1/02 | (2006.01) | |
| H04B 1/10 | (2006.01) | |
| H04B 7/04 | (2006.01) | |
| H04B 7/06 | (2006.01) | |
| H04W 24/10 | (2009.01) | |

(52) U.S. Cl.
CPC ........... *H04B 7/0417* (2013.01); *H04B 1/10* (2013.01); *H04W 24/10* (2013.01); *H04B 7/0452* (2013.01); *H04B 7/0634* (2013.01)
USPC ...................................................... 375/346

(58) Field of Classification Search
CPC ...... H04B 7/0413; H04B 7/0456; H04B 7/08; H04B 7/0842; H04B 7/086
USPC ......................................... 375/346, 347, 349
See application file for complete search history.

(56) References Cited

U.S. PATENT DOCUMENTS

| | | |
|---|---|---|
| 2010/0034146 A1 | 2/2010 | Hou et al. |
| 2010/0227613 A1 | 9/2010 | Kim et al. |
| 2010/0265813 A1 | 10/2010 | Pereira et al. |
| 2011/0034135 A1 | 2/2011 | Ali et al. |
| 2011/0051837 A1 | 3/2011 | Park et al. |
| 2011/0176629 A1 | 7/2011 | Bayesteh et al. |
| 2011/0200126 A1 | 8/2011 | Bontu et al. |
| 2011/0200131 A1 | 8/2011 | Gao et al. |
| 2011/0222469 A1 | 9/2011 | Ali et al. |
| 2011/0261745 A1 | 10/2011 | Bontu et al. |

FOREIGN PATENT DOCUMENTS

WO    2008081715 A1    7/2008

OTHER PUBLICATIONS

Cadambe, V. R., et al.; "Interference Alignment and Spatial Degrees of Freedom for the K-User Interference Channel"; IEEE International Conference on Communications 2008; p. 3425-3441; vol. 54, No. 8; Aug. 8, 2008.

(Continued)

*Primary Examiner* — Kevin Kim
(74) *Attorney, Agent, or Firm* — Cantor Colburn LLP

(57) ABSTRACT

A method, system and device are provided for using a predetermined vector, $v_{ref}$ and channel knowledge H, G from each transmitter to compute and feedback equivalent channel vector information $h_{i,j}^{eq}$ to its affiliated transmitter. With this information, each transmitter selects $L_i$ receivers and constructs a transmitted signal by applying a selected precoding vector to rank 1 data, thereby eliminating interference to the rest of the receivers in the network.

22 Claims, 7 Drawing Sheets

(56) References Cited

OTHER PUBLICATIONS

Cadambe, V. R., et al.; "Interference Alignment and Spatial Degrees of Freedom for the K Usere Interference Channel"; IEEE International Conference on Communications 2008; p. 971-975; May 23, 2008.

International Search Report and Written Opinion dated Oct. 17, 2011 for Application No. PCT/IB2011/050426.

International Search Report and Written Opinion dated Nov. 2, 2011 for Application No. PCT/IB2011/050427.

International Search Report and Written Opinion dated Nov. 2, 2011 for Application No. PCT/IB2011/050428.

Viveck R. Cadambe, et al, "Interference Alignment and Degrees of Freedom of the K-User Interference Channel," IEEE Transactions on Information Theory, vol. 54, No. 8, pp. 3425-3441; Aug. 2008.

Onur Ozan Koyluoglu et al., "Interference Alignment for Secrecy," IEEE International Symposium on Information Theory, pp. 1-15, 2008.

Mohammad Ali Maddah-Ali, et al, "Communication Over MIMO X Channels:Interference Alignment, Decomposition, and Performance Analysis," IEEE Transactions on Information Theory, vol. 54, No. 8, pp. 1-14; Aug. 2008.

Chenwei Wang, "Aiming Perfectly in the Dark—Blind Interference Alignment Through Staggered Antenna Switching," School of Information Theory, USC, pp. 1-12, Aug. 2010.

Suh, Changho, et al.; "Downlink Interference Alignment"; IEEE Globecom 2010; p. 1-5; Dec. 10, 2010.

Extended European Search Report for Application No. 13167278.4-1852, dated Oct. 7, 2013, pp. 1-8.

International Preliminary Report on Patentability dated Aug. 15, 2013 for PCT Application No. PCT/IB2011/050426, pp. 1-7.

International Preliminary Report on Patentability dated Aug. 15, 2013 for PCT Application No. PCT/IB2011/050427, pp. 1-6.

International Preliminary Report on Patentability dated Aug. 15, 2013 for PCT Application No. PCT/IB2011/050428, pp. 1-6.

Shin et al., "Interference alignment through user cooperation for two-cell MIMO interfering broadcast channels", Globecom Workshops (GC Wkshps), 2010 IEEE, Dec. 6, 2010, pp. 120-125.

US 8,811,552 B2

DOWNLINK MULTI-USER INTERFERENCE ALIGNMENT SCHEME

CROSS REFERENCE TO RELATED APPLICATIONS

This is a continuation of International Patent Application No. PCT/IB2011/050426, entitled "Downlink Multi-User Interference Alignment Scheme", , by inventors Alireza Bayesteh, Amin Mobasher, and Yongkang Jia, filed on Feb. 1, 2011, now pending, and incorporated by reference in its entirety.

BACKGROUND

One of the major challenges in wireless communication systems is to overcome interference caused by other users, such as when a mobile device in cellular systems receives interfering signals from multiple transmitters. Traditional schemes attempt to manage interference as noise or by orthogonalizing channel resources between different transmitters (base stations or access points) by assigning different frequency channels, time slots, or codes to different resources (e.g., FDMA/TDMA/CDMA). In addition, concurrent transmission techniques (interference alignment (IA)) have been proposed in which multiple senders jointly encode signals to multiple receivers so that interference is aligned and each receiver is able to decode its desired information. Interference alignment provides better performance than orthogonalization-based schemes by aligning the interference at a receiver coming from different sources in the least possible spatial dimensions to maximize the number of interference-free dimensions and hence, providing more degrees of freedom for signal transmission and improving the throughput performance. With interference alignment, a transmitter can partially or completely "align" its interference with unused dimensions of the primary terminals, thereby maximizing the interference-free space for the desired signal in an interference channel. For example, it has been shown that all the interference can be concentrated roughly into one half of the signal space at each receiver, leaving the other half available to the desired signal and free of interference. When considering sum capacity for n users in the high SNR regime, the sum capacity for each transmitter scaling as n/2 log(SNR) is achievable which is equivalent to n/2 degrees of freedom for the sum capacity for each transmitter. Moreover, for fixed SNR values, the sum capacity achieved by interference alignment has been shown to scale linearly with n. Interference alignment has also been considered in a Macro-cell scenario where multiple base stations (eNBs), each serving a rank-one user equipment (UE) device, collaborate with each other to decrease the effect of interference caused to each other's transmissions.

A significant challenge with existing interference alignment schemes is that they require perfect global channel knowledge about all channels in the network, which in turn imposes significant feedback overhead and coordination between nodes. In addition, existing interference alignment schemes are highly sensitive to channel estimation and quantization error, antenna configuration, and mobility. Accordingly, a need exists for improved methods, systems and devices for managing interference between network nodes to overcome the problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present disclosure may be understood, and its numerous objects, features and advantages obtained, when the following detailed description is considered in conjunction with the following drawings, in which.

DETAILED DESCRIPTION

Figure 1:
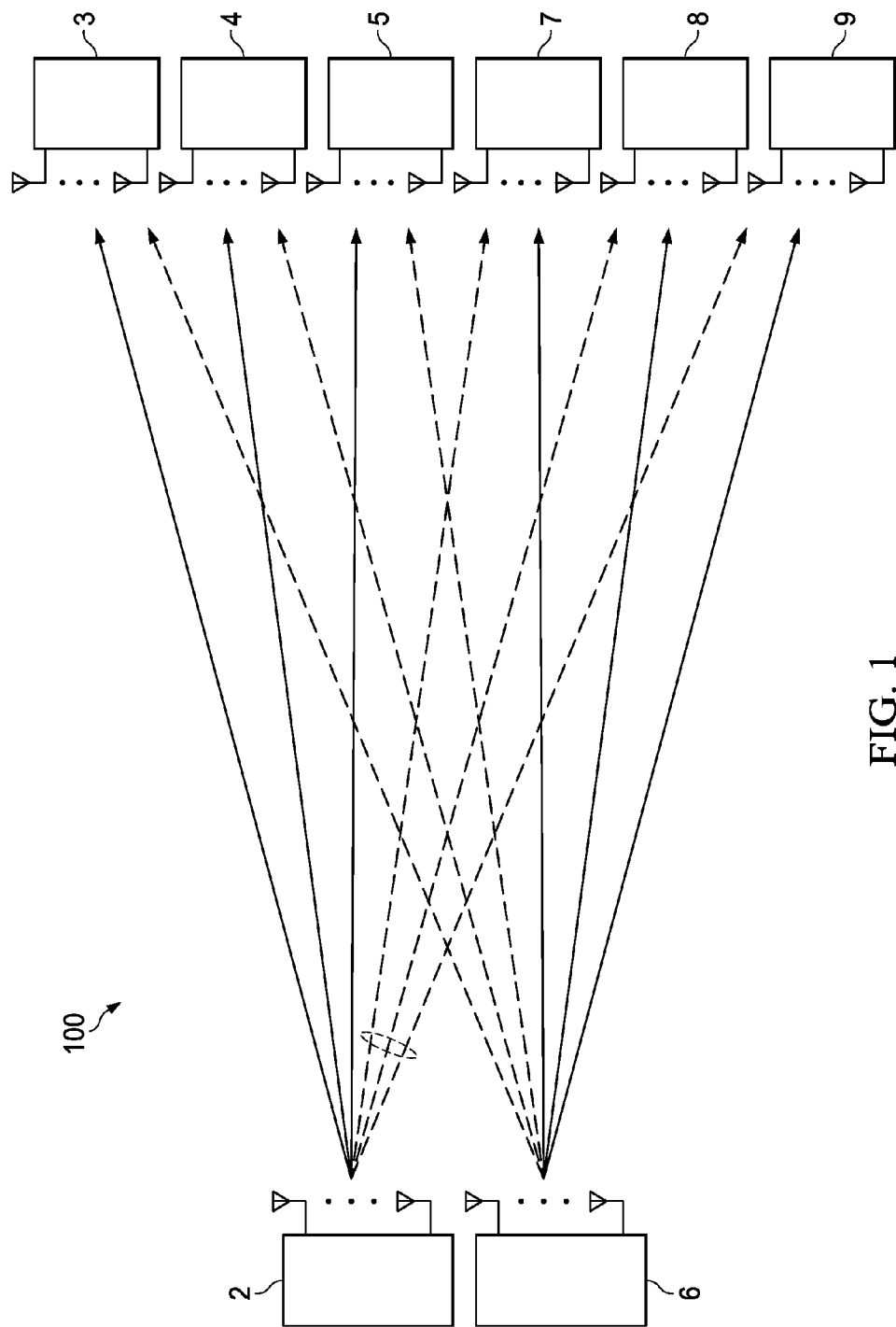
FIG. 1 is a schematic diagram showing components of a communication system in which there is downlink multi-user interference alignment between two transmitters and one or more single rank receivers in accordance with selected embodiments of the present disclosure.

The present disclosure is directed in general to communications systems and associated method of operation. In one aspect, the present disclosure relates to an interference alignment scheme for use in a wireless communication system.

An embodiment is directed to a method for aligning interference at a receiver having K receive antennas caused by first and second transmitters each having M transmit antennas, comprising: assembling at the receiver a first channel matrix and a second channel matrix for a first affiliated transmitter and a second interfering transmitter, respectively, computing an equivalent direct channel vector from the first and second channel matrices and a predetermined vector having size M, and applying a combining vector to decode single rank data signals received at the receiver, where the combining vector is derived from the predetermined vector and the equivalent direct channel vector to project all cross channels from the second transmitter to the predetermined vector to reduce or eliminate interference from the second transmitter.

An embodiment is directed to a method for transmitting one or more signals from a first transmitter having M transmit antennas to one or more single rank receivers affiliated with the first transmitter, where each of the one or more single rank receivers has K receive antennas and receives interference from a second transmitter having M transmit antennas, comprising: acquiring at the first transmitter an equivalent direct channel vector from each of the one or more receivers affiliated with the first transmitter, where each equivalent direct channel vector is computed at the corresponding receiver from a predetermined vector having size M and first and second channel matrices representing direct and cross channels to the corresponding receiver from the first and second transmitters, respectively, selecting a subset of the one or more receivers to receive one or more signals from the first transmitter, and for each receiver in the subset of the one or more receivers, applying a precoding vector to each single rank signal to be transmitted, where the precoding vector is derived from the predetermined vector and any equivalent direct channel vector from any other receiver affiliated with the first transmitter to reduce or eliminate interference to the receivers receiving signals from the first transmitter or from the second transmitter.

An embodiment is directed to a user equipment device configured to align interference from a cross channel, comprising: an array of K receive antennas configured to receive one or more signals over a direct channel from a first transmitter having M transmit antennas and to receive one or more interfering signals over a cross channel from a second transmitter having M transmit antennas, and a processor configured to align interference from the one or more interfering signals over the cross channel by: computing a direct channel matrix and a cross channel matrix for the direct and cross channels, respectively, retrieving a predetermined vector having size M from memory, where the predetermined vector is known by the first and second transmitters and by any other user equipment devices affiliated with the first or second transmitters, computing a combining vector as a product of an Hermitian of the predetermined vector and an inverse of the cross channel matrix, and applying the combining vector to decode one or more single rank data signals received at the user equipment device to project all cross channel signals from the second transmitter to the Hermitian of the predetermined vector to reduce or eliminate interference from the second transmitter.

An embodiment is directed to a computer-readable non-transitory storage medium embodying a computer program comprising instructions for aligning interference from a cross channel by: estimating a direct channel matrix for a direct channel from a first transmitter having M transmit antennas to a receiver having K receive antennas for receiving one or more signals over the direct channel, estimating a cross channel matrix for a cross channel from a second transmitter having M transmit antennas to the receiver having K receive antennas for receiving one or more interfering signals over the cross channel, retrieving a predetermined vector having size M from memory, where the predetermined vector is known by the first and second transmitters, computing a combining vector as a product of an Hermitian of the predetermined vector and an inverse of the cross channel matrix, and applying the combining vector to decode one or more single rank data signals received at the receiver to project all cross channel signals from the second transmitter to the Hermitian of the predetermined vector to reduce or eliminate interference from the second transmitter.

A method, system and device are provided for aligning interference in a wireless network with a low-complexity scheme without requiring perfect global channel knowledge and the attendant overhead to achieve good performance between two interfering transmitters, each serving the maximum possible number of single rank receivers simultaneously, while only requiring local channel knowledge at nodes. In selected embodiments, the disclosed interference alignment scheme is provided for downlink (DL) multi-user, multiple input, multiple output (MU-MIMO) transmissions between two interfering transmitters in a wireless network where each transmitter only needs to know the channel knowledge for its affiliated receivers, and where each receiver only needs the channel knowledge from itself to both transmitters. In the wireless network, two transmitters $TX_1$, $TX_2$ (e.g., Macro eNB, RN, Micro eNB, etc.) are each equipped with M antennas to serve $L_i$ receivers (e.g., user equipment (UE)) out of a total of $N_i$ receivers, where each transmitter knows at least the effective channels to its corresponding receivers. Each receiver is equipped with K antennas and is positioned to potentially receive interfering signals when the two transmitters use the same time slot and frequency band. Each receiver in cell i receives a single-rank transmission from transmitter $TX_i$ and uses a predetermined vector, $v_{ref}$ and channel knowledge H, G from each transmitter to i) convert the cross channel interference to the predetermined vector, $v_{ref}$, to leave more interference-free sub-space for signal transmission in its affiliated transmitter, and ii) compute and feedback equivalent channel vector information $h_{i,j}^{eq}$ to its affiliated transmitter. With this information, each transmitter selects $L_i$ receivers and constructs a transmitted signal by applying a selected precoding vector $$p_{i,s_1} = \text{null}\left(v_{ref}, \left\{h_{i,s_j}^{eqH}\right\}_{j\neq 1}\right).$$

Separate example scenarios are described to cover the case where the number of receiver antennas is greater than or equal to the number of transmitter antennas (e.g. K≥M) and where the number of transmitter antennas is greater than the number of receiver antennas (e.g. K≤M). In addition, low-complexity receiver scheduling algorithms are provided for improving the throughput performance and fairness.

Various illustrative embodiments of the present disclosure will now be described in detail with reference to the accompanying figures. While various details are set forth in the following description, it will be appreciated that the present disclosure may be practiced without these specific details, and that numerous implementation-specific decisions may be made to the disclosure described herein to achieve the device designer's specific goals, such as compliance with communication system limits or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present disclosure. Some portions of the detailed descriptions provided herein are presented in terms of algorithms and instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As used herein, the terms mobile wireless communication device and user equipment (UE) are used interchangeably to refer to wireless devices such as pagers, cellular phones, cellular smart-phones, wireless organizers, personal digital assistants, wireless Internet appliances, data communication devices, data messaging devices, computers, handheld or laptop computers, handheld wireless communication devices, wirelessly enabled notebook computers, mobile telephones, set-top boxes, network nodes, and similar devices that have wireless telecommunications capabilities. In wireless telecommunications systems, transmission equipment in a base station or access point transmits signals throughout a geographical region known as a cell. As technology has evolved, more advanced equipment has been introduced that can provide services that were not possible previously, including but not limited to enhanced node B (eNB) devices rather than a base station or other systems and devices that are more highly evolved than the equivalent equipment in a traditional wireless telecommunications system. Examples of such advanced or next generation equipment include, but are not limited to, LTE equipment or LTE-Advanced (LTE-A) equipment, and a packet-based network that uses such equipment can be referred to as an evolved packet system (EPS). As used herein, the terms access device or access point refer interchangeably to any component that can provide a UE with access to other components in a telecommunications system, including but not limited to a traditional base station or an LTE or LTE-A access device. An access point provides radio access to one or more UEs using a packet scheduler to dynamically schedule downlink traffic data packet transmissions and allocate uplink traffic data packet transmission resources among all the UEs communicating to the access device. The functions of the scheduler include, among others, dividing the available air interface capacity between UEs, deciding the transport channel to be used for each UE's packet data transmissions, and monitoring packet allocation and system load. The scheduler dynamically allocates resources for Physical Downlink Shared CHannel (PDSCH) and Physical Uplink Shared CHannel (PUSCH) data transmissions, and sends scheduling information to the UEs through a control channel.

Referring now to FIG. 1, there is shown a schematic diagram depiction of a communication system 100 in which there is downlink multi-user interference alignment implemented for signal transmissions from transmitters 2, 6 to receivers 3-5, 7-9 in accordance with selected embodiments of the present disclosure. In the depicted embodiment, each of the transmitters $TX_1$ and $TX_2$ (e.g., eNBs) is equipped with M antennas and configured to transmit signals to receivers (e.g., UEs) which are each equipped with K antennas. The area covered by transmitter $TX_i$ is referred to as cell i and the jth UE in cell i is referred to as UE (i,j) where there are as many as $L_i$ UEs may be served by the transmitter $TX_i$. Each transmitter $TX_i$, 2, 6 denotes a data transmission device such as a fixed base station, a mobile base station, Macro eNB, Relay Node, Micro eNB, a miniature or femto base station, a relay station, and the like. Each of the receiver nodes 3-5, 7-9 denotes a data reception device such as a relay station, a fixed terminal, a mobile terminal, user equipment and the like.

Depending on the transmission scheme used by the transmitter $TX_i$ and the location of the UEs, interference may occur at one or more of the receiver nodes 3-5, 7-9. For example, at the first receiver node 3 (denoted $UE_{1,1}$) in the first cell, a signal from the first transmitter $TX_1$ corresponds to a desired signal but a co-channel signal from the second transmitter $TX_2$ may cause interference if the second transmitter uses the same time slot and frequency band as the first transmitter. At the first receiver node $UE_{1,1}$, the desired signal from the first transmitter $TX_1$ arrives over direct channel $H_{1,1}$, while the interfering signal from the second transmitter $TX_2$ arrives over cross channel $G_{1,1}$. Similarly, interference may occur in the other receiver nodes 4-5, 7-9 that decreases signal throughput of the network 100. To overcome the interference between transmitters $TX_1$ and $TX_2$, an interference alignment scheme is proposed for downlink MIMO transmission where each transmitter only needs to know the channel state information (CSI) for its affiliated UEs, and each UE only needs to know the channel between itself and each transmitter. In selected embodiments, the proposed interference alignment scheme uses a combining vector at each of the UEs 3-5, 7-9 to project all cross channels from an interfering transmitter to a predetermined vector $v_{ref}^H$, thereby eliminating inter-cell interference if each transmitter sends its signal in the null space of the predetermined vector $v_{ref}^H$. In addition, each transmitter uses channel quality information (CQI) and equivalent direct channel vector information $h_{i,j}^{eq}$ for selected UEs to perform link adaptation and to precode data with a precoding vector $p_{i,s_i}$ to cancel out both the inter-UE and inter-cell interference. The result is indicated at the first receiver node 7 (denoted $UE_{2,1}$) in the second cell where the desired signal from the second transmitter $TX_2$ arrives over direct channel $H_{2,1}$, while the interfering signal $G_{2,1}$ from the first transmitter $TX_1$ has been aligned to $v_{ref}^H$.

Interference Alignment for Case K≥M

As disclosed herein, the interference alignment schemes can be used in cases where the number of receive antennas on the UEs 3-5, 7-9 is greater than or equal to the number of transmit antennas on the transmitters 2, 6 (e.g. K≥M) since all cross channels $G_{i,j}$ are invertible with a probability of almost 1 in a multipath rich propagation environment. In this case, the direct channel from $TX_i$, i=1, 2, to the jth UE in the same cell is denoted by and the cross channel from the interfering transmitter to the same UE is denoted by $G_{i,j}$. The received signal at this UE can be written as $$y_{i,j} = H_{i,j} x_i + G_{i,j} x_{3-i} + n_{i,j}, i=1,2, \qquad (1)$$

where $x_i$ denotes the transmitted signal from TX and $n_{i,j}$ is the receive noise at the jth UE in cell i. Both the direct and cross channels $H_{i,j}$ and $G_{i,j}$ can be estimated at the jth UE using any desired technique, such as downlink pilot or reference signaling.

In this case where the number of UE receiver antennas meets or exceeds the number of transmitter antennas (K≥M), all cross channels $G_{i,j}$ are invertible with a probability of almost one in a multipath rich propagation environment, meaning that the pseudo inverse of the cross channel is given by $G_{i,j}^+ = (G_{i,j}^H G_{i,j})^{-1} G_{i,j}^H$ such that $G_{i,j}^+ G_{i,j} = I$ where I denotes the identity matrix. As a result, an arbitrary vector of size M, $v_{ref}$, can be distributed and known to all UEs and transmitters and used by each $UE_{i,j}$ to compute a combining vector $r_{i,j}$ as follows:

$$r_{i,j} = v_{ref}^H G_{i,j}^+, \qquad (2)$$

where $(.)^H$ denotes the complex transpose operation.

If the signal received at each $UE_{i,j}$ (Equation (1)) is multiplied by combining vector the result is:

$$\tilde{y}_{i,j} = v_{ref}^H G_{i,j}^+ y_{i,j} = h_{i,j}^{eq} x_i + v_{ref}^H x_{3-i} + n_{i,j}^{eq}, i=1,2, \qquad (3)$$

where the equivalent direct transmission channel vector $h_{i,j}^{eq} = v_{ref}^H G_{i,j} + H_{i,j}$, where equivalent noise term $n_{i,j}^{eq} = v_{ref}^H G_{i,j} + H_{i,j}$, and where $x_{3-i}$ refers to interfering data from the "other" transmitter. After estimation of $H_{i,j}$ and $G_{i,j}$, each UE (i,j) feeds back the equivalent direct transmission channel vector $h_{i,j}^{eq}$ to its affiliated transmitter $TX_i$. Alternatively, each transmitter $TX_i$ operating in time division duplexing (TDD) mode can estimate $h_{i,j}^{eq}$ from the uplink channel if the $UE_{i,j}$ sends the pilot signal in the direction of the transpose of the combining vector $r_{i,j}^T$, where $(.)^T$ denotes the transpose operation.

Once the transmitter $TX_i$ acquires the equivalent direct transmission channel vector $h_{i,j}^{eq}$ from all affiliated UEs, transmitter $TX_i$ selects $L_i$ UEs indexed by $(s_1, \ldots, s_{L_i})$ and constructs the transmitted signal $x_i$ as follows:

$$x_i = \sum_{l=1}^{L_i} p_{i,s_l} u_{i,s_l}, \quad (4)$$

where $p_{i,s_l}$ denotes the precoding vector for the selected $UEs_l$, and where $u_{i,s_l}$ is the rank-1 data for the selected $UEs_l$.

The transmitter $TX_i$ computes or obtains the precoding vector $p_{i,s_l}$ as follows:

$$p_{i,s_1} = \mathrm{null}\left(v_{ref}, \{h_{i,s_j}^{eq H}\}_{j \neq 1}\right),$$

where null(.) denotes the null space operation.

As the transmitted signal $x_i$ is received at the UE, it may be represented by substituting Equation (4) in Equation (3) to get:

$$\tilde{y}_{i,s_j} = h_{i,s_j}^{eq} p_{i,s_j} u_{i,s_j} + n_{i,s_j}^{eq}. \quad (6)$$

As seen in Equation (6), inter-cell and intra-cell interference are cancelled and UEs can decode their data using single-user detection.

In addition to feeding back equivalent direct channel vector information $h_{i,j}^{eq}$, each $UE_{i,j}$ may feed back additional information to its affiliated transmitter, such as Channel Quality Indicator (CQI), which is used by the transmitter $TX_i$ for scheduling and link adaptation. One example of CQI feedback would be the effective noise power, i.e., $E\{|n_{i,j}^{eq}|^2\}$, where $E\{.\}$ denotes the expectation, or its inverse $$\frac{1}{E\{|n_{i,j}^{eq}|^2\}}.$$

With this information, transmitters can perform scheduling and also the link adaptation for the selected UEs based on their effective SNR based on the following formula:

$$SNR_{i,s_j}^{eff} = \frac{P_i \|h_{i,s_j}^{eq} p_{i,s_j}\|^2}{L_i E\{|n_{i,j}^{eq}|^2\}}. \quad (7)$$

By using the combining vector $r_{i,j}$ at each UE to project all interfering cross channels to the predetermined vector $v_{ref}^H$, the disclosed interference alignment scheme allows up to M-1 UEs to be served simultaneously by each transmitter using the precoding vector $p_{i,s_l}$ (from Equation (5)). As a result, 2M-2 UEs can be served in total by the network 100 since all interfering cross channels are aligned in the direction of $v_{ref}^H$, thereby reserving more dimensions for signal transmission.

Figure 2:
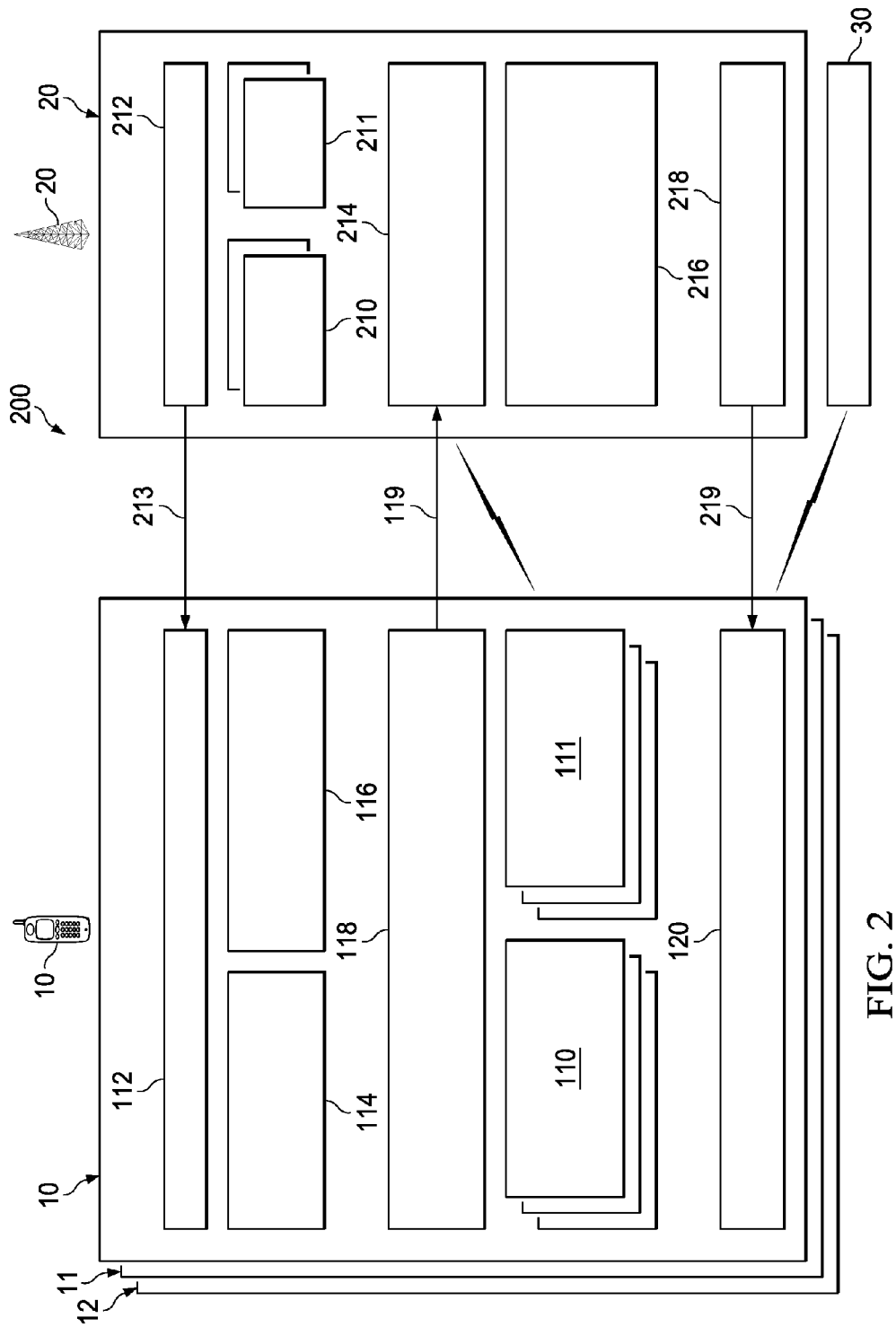
FIG. 2 is a schematic diagram showing components of a communication system which provides interference alignment between two interfering transmitters, each sending single rank transmissions to the maximum possible number of receivers simultaneously while only requiring local channel state knowledge at the transmitters such that all crossed channels are aligned to a predetermined reference vector.

To understand how the predetermined vector $v_{ref}^H$ is used to align interference in the network 100, reference is now made to FIG. 2 which schematically depicts a communication system 200 which provides interference alignment between two interfering access devices 20, 30 and one or more single rank user equipment (UE) devices 10-12 requiring only local channel state knowledge at the access devices 20, 30 such that all crossed channels are aligned to a predetermined reference vector. To this end, each of the UEs 10-12 is configured to compute equivalent direct channel vector information $h_{i,j}^{eq}$ from a predetermined vector $v_{ref}$. After feeding back the equivalent direct channel vector information $h_{i,j}^{eq}$ to the affiliated access device (e.g., 20), the access device 20 constructs a transmission signal x by precoding the transmit data in the null space of $v_{ref}^H$ so that no interference is imposed to the UEs in the other cell. For purposes of transforming the transmit data and signals as described herein, the UE 10 includes, among other components, one or more processors 110 that run one or more software programs or modules embodied in circuitry and/or non-transitory storage media device(s) 111 (e.g., RAM, ROM, flash memory, etc.) to communicate with access device 20 to receive data from, and to provide data to, access device 20. When data is transmitted from UE 10 to access device 20, the data is referred to as uplink data and when data is transmitted from access device 20 to UE 10, the data is referred to as downlink data.

As part of the MIMO downlink process, the UE 10 determines, quantifies or estimates the channel matrices H and G which respectively represent the channel gain between the first access device 20 and second access device 30 and the UE. For example, the channel matrix H can be represented by a K×M matrix of complex coefficients, where M is the number of transmit antennas in the first access device 20 and K is the number of receive antennas in the UE 10. Alternatively, the channel matrix H can instead be represented by an M×K matrix of complex coefficients, in which case the matrix manipulation algorithms are adjusted accordingly. The coefficients of the channel matrix H depend, at least in part, on the transmission characteristics of the medium, such as air, through which a signal is transmitted. A variety of methods may be used at the receiver to determine the channel matrix H and G coefficients, such as transmitting a known pilot signal to a receiver so that the receiver, knowing the pilot signal, can estimate the coefficients of the channel matrix H and G using well-known pilot estimation techniques. Alternatively, when the channel between the transmitter and receiver are reciprocal in both directions, the actual channel matrix H is known to the receiver and may also be known to the transmitter. To this end, each access device (e.g., 20) may include a pilot signal generator (e.g., 212) for generating and transmitting a pilot signal 213. In addition, each UE 10 may include a channel estimation module 112 using hardware and/or software executed by one or more processor elements to determine or estimate the channel matrices H and G from the access devices 20, 30.

At the UE 10, a combining vector computation module 114 is provided for computing or retrieving a combining vector $r_{i,j}$. In the cases where the UE antenna count K is at least equal to the access device antenna count M, the estimated channel matrices H and G may be used to compute the combining vector by first computing the pseudo inverse of the interfering cross channel $G^+$. Next, an arbitrary vector of size M, $v_{ref}$, is defined or obtained, where the vector $v_{ref}$ is known to all UEs and transmitters because it was signaled or pre-determined.

After determining the Hermitian transpose of the vector $v_{ref}^H$, the computation module 114 then computes the combining vector $r=v_{ref}^H G^+$.

The UE 10 also includes an equivalent channel vector computation module 116 which multiplies the combining vector r and estimated direct channel matrix H to compute $h^{eq}=r H=v_{ref}^H G^+ H$. The UE 10 may feed back the equivalent channel vector $h^{eq}$ to the access point 20, which also receives equivalent channel vector information from the other affiliated UEs 11, 12 in the cell for access point 20. In selected embodiments, the feedback module 118 sends the equivalent channel vector $h^{eq}$ as an uplink message 119. Alternatively, when TDD mode is used, the access point 20 can estimate the equivalent channel vector $h^{eq}$ from the uplink channel if the UE sends the pilot signal in the direction of $r^T$. The feedback module 118 may also send CQI information, such as an indication of effective noise power, to the access point 20 for use in scheduling and link adaptation.

At the access device 20, the equivalent channel vector $h^{eq}$ and CQI information is processed and transformed by one or more processors 210 that run one or more software programs embodied in non-transitory storage media device(s) 211 (e.g., RAM, ROM, flash memory, etc.). For example, after receiving the equivalent channel vector $h^{eq}$ and any CQI information from all affiliated UEs 10-12, the access point 20 processes the feedback information to avoid any co-channel interference to non-affiliated UEs. In selected embodiments, a selection module 214 at the access point 20 uses the acquired equivalent channel vectors and any CQI information to select a subset of $L_i$ UEs out of a total of $N_i$ UEs. The selected $L_i$ UEs are indexed by $(s_1, \ldots, s_l)$. The access point 20 also includes a precoding module 216 which uses the equivalent channel vector $h^{eq}$ to construct or precode the transmitted signal $$x_i = \sum_{l=1}^{L_i} p_{i,s_l} u_{i,s_l},$$

where $p_{i,s_l}$ denotes the precoding vector for the selected UEs$_l$ and $u_{i,s_l}$ is the rank-1 data for this UE. In particular, the precoding module 216 may compute the precoding vector $$p_{i,s_1} = \text{null}\left(v_{ref}, \{h_{i,s_j}^{eq H}\}_{j \neq 1}\right).$$

Though not shown, there may also be scheduling and link adaptation performed on the data $u_{i,s_j}$ at the precoding module 216 or transmit module 218. As the precoded data $x_i$ is transmitted over a downlink message 219 to the UE 10, it is received at the decode module 120 where it appears as the received signal $\tilde{y}_{i,s_j} = h_{i,s_j}^{eq} p_{i,s_j} u_{i,s_j} + n_{i,s_j}^{eq}$ in which the inter-cell and intra-cell interference are cancelled. As a result, the UE 10 can decode data from the received signal using single-user detection schemes.

Figure 3:
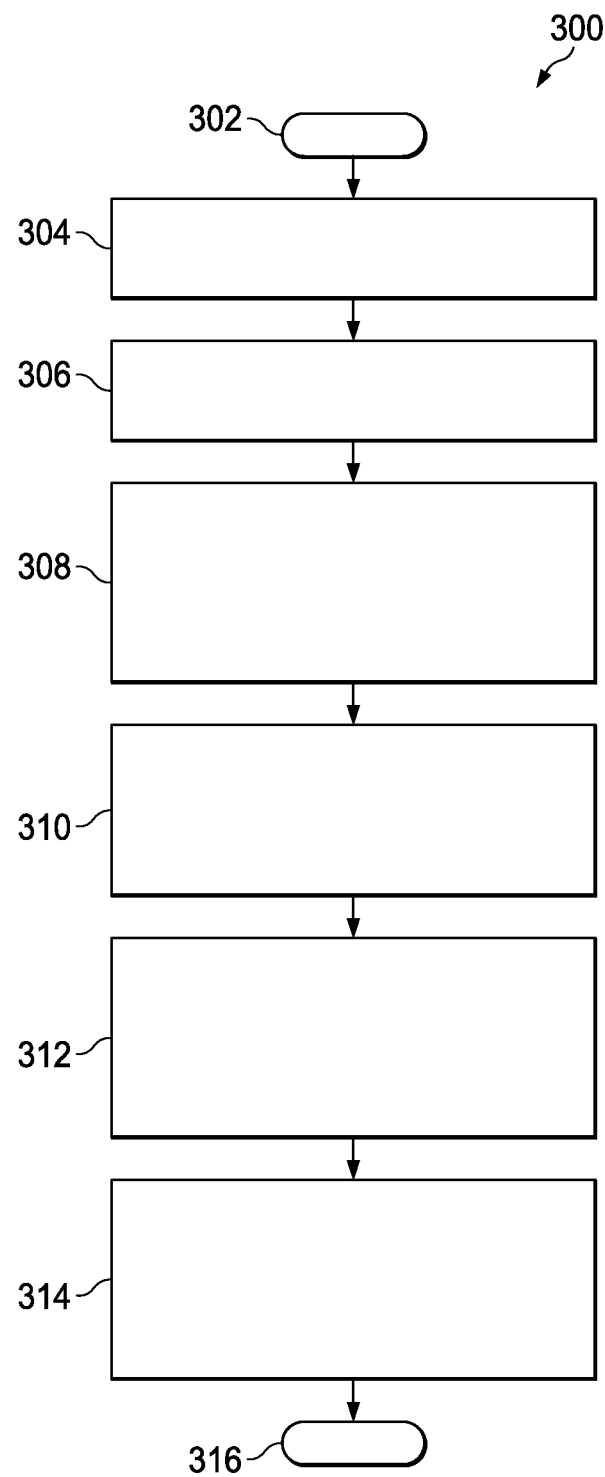
FIG. 3 is a flow chart illustrating an interference alignment process that may be performed when the number of receiver antennas equals or exceeds the number of transmitter antennas.

Referring now to FIG. 3, there is depicted in flow chart form an interference alignment process 300 that may be performed when the number of receiver antennas K equals or exceeds the number of transmitter antennas M. Once the procedure starts (step 302), each UE$_{i,j}$ device estimates or computes at (step 304) the direct channel $H_{i,j}$ and cross channel $G_{i,j}$ to the UE$_{i,j}$ device from potentially interfering transmitters TX$_1$ and TX$_2$. Channel information may be computed using pilot estimation techniques.

At step 306, each UE$_{i,j}$ device computes the combining vector $r_{i,j}$ based on the cross channel $G_{i,j}$, such as by multiplying the hermitian reflection of the shared predetermined reference vector $v_{ref}$ and the pseudo inverse of the cross channel G. In addition, each UE$_{i,j}$ device computes the equivalent direct channel vector information h based on the estimated direct channel $H_{i,j}$ and the computed combining vector $r_{i,j}$.

At step 308, each UE$_{i,j}$ device feeds back the equivalent direct channel vector information $h_{i,j}^{eq}$ to its affiliated access device, along with any channel quality indicator (CQI), either directly or indirectly using codebook techniques. In addition or in the alternative, each of the transmitters TX$_1$ and TX$_2$ acquires the equivalent direct channel vector information $h_{i,j}^{eq}$ at step 310, either using feedback from associated UEs or by using uplink channel estimation techniques.

At step 312, each transmitter TX$_i$ selects $L_i$ UE devices from a total of $N_{,i}$ UE devices in the ith cell, and then constructs transmit signals $x_i$ for the selected UEs. In selected embodiments, the transmit signals $x_i$ are constructed using a precoding vector technique (such as described at Equations (4) and (5)) and/or link adaptation technique (such as described at Equation (7)), and then transmitted as downlink data to the selected UEs.

At step 314, each UE$_{i,j}$ device decodes its transmitted signal $x_i$ which appears as a receive signal vector $\tilde{y}_{i,s_j} = h_{i,s_j}^{eq} p_{i,s_j} u_{i,s_j} + n_{i,s_j}^{eq}$. In order to decode the receive signal vector, each UE$_{i,j}$ device may know or derive its own precoding vector $p_{i,s_j}$. Having used the combining vector $r_{i,j}$ at the UE side to project all cross channels $G_{i,j}$ to a predetermined reference vector $v_{ref}$, each UE$_{i,j}$ device may use single-user detection to decode transmitted single rank data. At step 316, the process ends.

Interference Alignment for Case K<M

In addition to the foregoing, selected embodiments may also implement the disclosed interference alignment schemes in cases where the number of antennas on the eNB is greater than the number of receive antennas on the UE (e.g. K<M), provided that adjustments are made to match or correlate the cross channels $G_{i,j}$ with the predetermined vector $v_{ref}^H$. The adjustments are required because the cross channels $G_{i,j}$ are not invertible in the case where the UE antenna count K is less than the access device antenna count M, and as a result, combining vector (described above) cannot be used to match the equivalent cross channels perfectly to the predetermined reference vector $v_{ref}^H$. To address this matching problem, a number of adjustment schemes may be used.

Euclidean Distance Minimization

In a first adjustment scheme, Euclidean Distance Minimization (EDM) techniques may be used to find or compute an EDM combining vector $r_{i,j}$ which minimizes the Euclidean distance of the equivalent cross channel $(r_{i,j} G_{14})$ to $v_{ref}^H$. Referring to FIG. 2, the EDM technique may be implemented by the combining vector computation module 114 at each UE to solve the following optimization problem:

$$r_{i,j} = \arg\min_{r} \|G_{i,j}^H r^H - v_{ref}\|^2 \text{ such that } \|G_{i,j}^H r^H\|^2 = 1, \quad (8)$$

which has the solution of $$r_{i,j} = \frac{v_{ref}^H G_{i,j}^+}{\|v_{ref}^H G_{i,j}^+ G_{i,j}\|}, \quad (9)$$

where $G_{i,j}^+ = G_{i,j}^H (G_{i,j} G_{i,j}^H)^{-1}$ is defined such that $G_{i,j} G_{i,j}^+ = I$.

Once the EDM combining vector $r_{i,j}$ is computed, the equivalent direct channel vector information $h_{i,j}^{eq}$ is computed, and the processing at the UE 10 and the access point 20 proceeds substantially as described with reference to steps 308-314 in the interference alignment process 300 depicted in FIG. 3. However, the computation of effective SNR at the transmitter for scheduling and link adaptation may be replaced by computing an effective signal to interference plus noise ratio (SINR) as follows:

$$SINR_{i,s_j}^{eff} = \frac{\frac{P_i}{L_i}\|h_{i,s_j}^{eq} p_{i,s_j}\|^2}{\frac{P_{3-i}}{M-1}(1-|r_{i,j}G_{i,j}v_{ref}|^2) + E\{|n_{i,s_j}^{eq}|^2\}}, \quad (10)$$

where $p_{3-i}$ refers to interfering power from the "other" transmitter. As a result of this adjustment, the CQI computation can be modified to capture the inter-cell interference term $$\frac{P_{3-i}}{M-1}(1-|r_{i,j}G_{i,j}v_{ref}|^2)$$

Time/Frequency Extension

In a second adjustment scheme for cases where the number of antennas on the eNB is greater than the number of receive antennas on the UE (e.g. K<M), the interfering channels of UEs are extended in time or frequency domain such that the aggregate channel becomes invertible. For example, in OFDM systems like LTE or LTE-Advanced systems, the channels can be extended by using time/frequency resource elements. By extending the time/frequency of the interfering co-channels, the combining vector $r_{i,j}$ can be used to match the extended cross channels $G_{i,j}$ with the predetermined vector $v_{ref}^H$.

Figure 4:
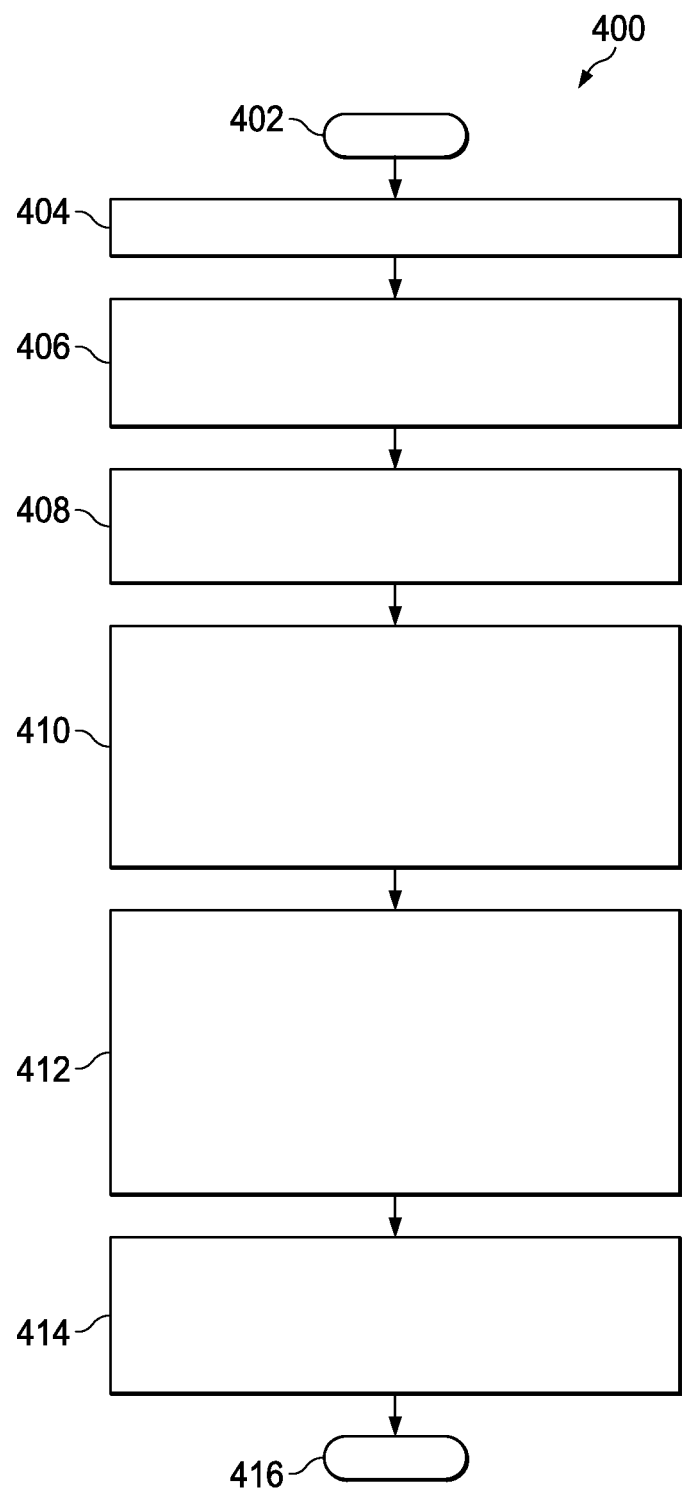
FIG. 4 is a flow chart illustrating an interference alignment process that may be performed to extend the interfering channels in frequency in cases when the number of transmitter antennas exceeds the number of receiver antennas.

To illustrate an example interference alignment process that may be performed to extend the interfering channels in frequency, reference is now made to FIG. 4 which depicts in flow chart form an interference alignment process 400 that may be performed in cases when the number of transmitter antennas exceeds the number of receiver antennas. Once the procedure starts (step 402), each $UE_{i,j}$ device effectively extends the interfering channels by finding or deriving n1 and n2 that are the smallest integer numbers (at step 404) such that:

$$n1M=n2K(n2>n1). \quad (11)$$

For example, if M=4 and K=2, then we have n1=1 and n2=2.

At step 406, each $UE_{i,j}$ device estimates or computes the direct channel $H_{i,j}$ and cross channel $G_{i,j}$ to the $UE_{i,j}$ device from potentially interfering transmitters $TX_1$ and $TX_2$. The channel estimation module 112 shown in FIG. 2 may be used here to implement pilot signal estimation or any other desired channel estimation technique.

At step 408, each $UE_{i,j}$ device computes extended direct and cross channel matrix information. The combining vector computation module 114 shown in FIG. 2 may be used to compute the extended direct and cross channel matrix information. To implement frequency extension, the cross channel of the UE (i,j) in the subcarriers $w_1$ to $w_{n2}$ may be denoted as $\{G_{i,j}(w_k)\}_{k=1}^{n2}$, where it is understood that a subcarrier refers to a frequency unit or band. With this approach, the aggregate cross channel is defined as $$G_{i,j} \triangleq [G_{i,j}(w_1)^T| \ldots |G_{i,j}(w_{n2})^T]^T,$$

where $[.]^T$ denotes the transpose operation. From the foregoing, the size of the cross channel $G_{i,j}$ is (n2K)×M=(n1M)×M, and the cross channel $G_{i,j}$ may be represented as follows:

$$G_{i,j}=[F_{i,j}(t_1)^T| \ldots |F_{i,j}(t_{n1})^T]^T, \quad (12)$$

in which $\{F_{i,j}(t_k)\}_{k=1}^{n1}$ are all square M×M matrices that are invertible with probability almost equal to one in a multipath rich frequency selective channel with tone separations larger than the coherence channel bandwidth. Similarly, the aggregate matrix of direct channels $H_{i,j} \triangleq [H_{i,j}(w_1)^T| \ldots |H_{i,j}(w_{n2})^T]^T$ may be represented as:

$$H_{i,j}=[K_{i,j}(t_1)^T| \ldots |K_{i,j}(t_{n1})^T]^T. \quad (13)$$

With this transformation, the transmitted and received signals and noise vectors in the subcarriers $w_1, \ldots, w_{n2}$ can be transformed to:

$$X_i \triangleq [x_i(w_1)^T| \ldots |x_i(w_{n2})^T]^T=[q_i(t_1)^T| \ldots |q_i(t_{n1})^T]^T, \quad (14)$$

$$Y_i \triangleq [y_i(w_1)^T| \ldots |y_i(w_{n2})^T]^T=[z_i(t_1)^T| \ldots |z_i(t_{n1})^T]^T, \quad (15)$$

$$n_i \triangleq [n_i(w_1)^T| \ldots |n_i(w_{n2})^T]^T=[w_i(t_1)^T| \ldots |w_i(t_{n1})^T]^T. \quad (16)$$

At step 410, each device computes and feeds back the effective direct channel vector information $h_{i,j}^{eq}(t_k)$ for each $t_k$, k=1, ... n1 based on the effective estimated direct and cross channel $K_{i,j}$, $F_{i,j}$. The equivalent channel vector computation module 116 shown in FIG. 2 may be used to compute the equivalent channel vector. In an example embodiment, each device computes or derives a combining vector $r_{i,j}(t_k)=v_{ref}^H F_{i,j}^{-1}(t_k)$, such as by multiplying the hermitian reflection of the shared predetermined reference vector $v_{ref}$ and the pseudo inverse of the effective cross channel $F_{i,j}^{-1}(t_k)$. As a result, the received signal $\tilde{z}_{i,j}(t_k)$ appears at the UE as:

$$\tilde{z}_{i,j}(t_k)=v_{ref}^H F_{i,j}^{-1}(t_k)z_{i,j}(t_k)=h_{i,j}^{eq}(t_k)q_i(t_k)+v_{ref}^H q_{3-i}(t_k)+n_{i,j}^{eq}(t_k), \quad (17)$$

where $h_{i,j}^{eq}(t_k)=v_{ref}^H F_{i,j}^{-1}(t_k)K_{i,j}(t_k)$ and $n_{i,j}^{eq}(t_k)=v_{ref}^H F_{i,j}^{-1}(t_k)w_{i,j}(t_k)$.

At step 410, the effective direct channel vector information $h_{i,j}^{eq}(t_k)$ may be fed back to its affiliated access device along with any channel quality indicator (CQI), either directly or indirectly using codebook techniques. The feedback module 118 shown in FIG. 2 may be used to feedback the effective channel vector and CQI information. In addition or in the alternative, each of the transmitters $TX_1$ and $TX_2$ may acquire the effective direct channel vector information $h_{i,j}^{eq}(t_k)$ using uplink channel estimation techniques.

At step 412, each transmitter $TX_i$ acquires $\{h_{i,j}^{eq}(t_k)\}_{k=1}^{n1}$ and $\{CQI_{i,j}(t_k)\}_{k=1}^{n1}$ (possibly via the feedback information by UEs) for its affiliated UEs, and uses this information to select $L_i$ UE devices from a total of $N_i$ UE devices in the ith cell. The selection module 214 shown in FIG. 2 may be used to select the $L_i$ UE devices indexed by $(s_1, \ldots, s_{Li})$ based on the received effective channel vector and CQI information.

At step 412, each transmitter $TX_i$ also constructs transmit signals $q_i(t_k)$ for the selected $L_i$ UE devices. In selected embodiments, the precoding module 216 shown in FIG. 2 may be used to the construct transmit signals $q_i(t_k)$ using a precoding vector $p_{i,s_j}(t_k)$ $$q_i(t_k) = \sum_{l=1}^{L_i} p_{i,s_l}(t_k)u_{i,s_l}(t_k) \quad (18)$$

where $$p_{i,s_j}(t_k)=\text{null}(v_{ref}, \{h_{i,s_j}^{eq H}(t_k)\}_{j \neq l}), \quad (19)$$

At each transmitter $TX_i$, the data to be transmitted to the selected $UE_{s_l}$ over the subcarriers $w_1, \ldots, w_{n2}$ is split into n1 rank-1 data $\{u_{i,s_l}(t_k)\}_{k=1}^{n1}$. After computing $\{q_i(t_k)\}_{k=1}^{n1}$, the transmitted signals over subcarriers $w_1, \ldots, w_{n2}$ can be computed from Equation (14). The transmit module 218 shown in FIG. 2 may be used to the transmit signals $q_i(t_k)$.

At step 414, the UE decodes the received data signal, such as by using the decode module 120 shown in FIG. 2. In selected embodiments, each UE(i,$s_l$) may know its own precoding vector $\{p_{i,s_i}(t_k)\}_{k=1}^{n1}$, and uses the precoding vector to decode its data $\{u_{i,s_i}(t_k)\}_{k=1}^{n1}$ from $\{\tilde{z}_{i,s_i}(t_k)\}_{k=1}^{n1}$ which is obtained from Equation (17). For example, each UE(i,$s_l$) converts the received signals in subcarriers $w_1, \ldots, w_{n2}$ to $\{z_{i,j}(t_k)\}_{k=1}^{n1}$ from Equation (15), and converts them to $\{\tilde{z}_{i,j}(t_k)\}_{k=1}^{n1}$ from Equation (17). In this way, the selected UEs can decode their data $\{u_{i,s_i}(t_k)\}_{k=1}^{n1}$ from $\{\tilde{z}_{i,s_i}(t_k)\}_{k=1}^{n1}$. At step 416, the process ends.

While the description provided with reference to Equations (11)-(19) explains how the direct and interfering channels as well as the corresponding transmit and receive signals of UEs are extended in the frequency domain, it will be appreciated that a similar approach would be used to extend the interfering channels in the time domain. In either case of time or frequency extension, it will be appreciated that there is implied a loss in the spectral efficiency by the ratio of $$\frac{n1}{n2}$$

compared to the M=K case due to the fact that n1 independent signals are transmitted over n2 subcarriers. As a consequence, the extension scheme may not be suitable for small values of $$\frac{n1}{n2}.$$

In addition, it will be appreciated that the frequency extension approach has more potential for practical use since the time extension approach implies decoding delay which is not acceptable for many applications.

In selected embodiments, the throughput performance in the case of frequency extension can be improved by selecting a proper set of subcarriers to implement the frequency extension algorithm. For this purpose, it is important to have the matrices $\{K_{i,j}(t_k)\}_{k=1}^{n1}$ as far away as possible from the singularity. One way to satisfy this would be to make the chordal distance between the subspaces spanned by $\{G_{i,j}(w_k)\}_{k=1}^{n2}$ above a certain (configurable) threshold. To this end, all UE devices that are going to be served in the "interference alignment" mode may be configured to select the potential subcarriers and order them based on some pre-configured metrics. In selected embodiments, subcarrier ordering is done in a greedy fashion by first selecting a "best" subcarrier (e.g., the subcarrier having the maximum minimum eigenvalue for the interfering channel), and then selecting the next "best" subcarrier, and so on. After selecting i-1 subcarriers, the ith subcarrier is selected as the one whose minimum eigenvalue of the corresponding interfering channel is greater than a predetermined threshold and its chordal distance to the interfering channel of the previously selected subcarriers is greater than another pre-configured threshold. UEs can feed back some information to the transmitters in the form of CQI to reflect this ordering.

With this information provided to the transmitter, the transmitter identifies a set of subcarriers (say $w_1, \ldots, w_{n2}$) that the transmitters want to use interference alignment, and then selects up to M-1 UEs that already reported these subcarriers as their potential subcarriers for interference alignment (the ones with high ranks). Then, the transmitter uses the frequency extension approach described hereinabove.

UE Selection and Scheduling

Figure 5:
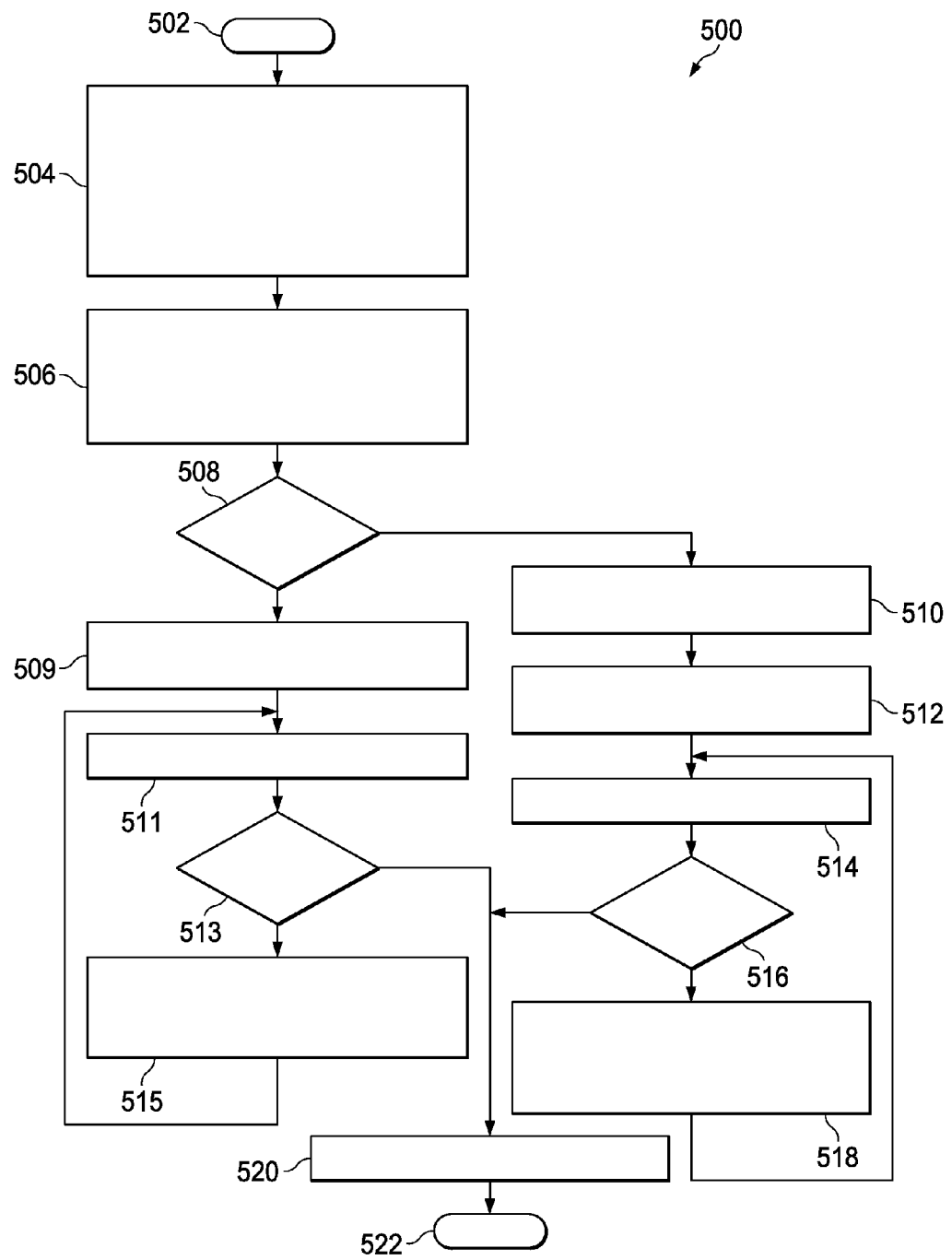
FIG. 5 is a flow chart illustrating a receiver selection process that may be performed when the number of receiver antennas equals or exceeds the number of transmitter antennas.

When the transmitter is selecting $L_i$ UEs in cell i that is less than the total number of UEs ($N_i$), selected embodiments of the present disclosure provide a low-complexity scheduling and pairing scheme for choosing the UEs that achieves good performance and improves the throughput performance of the system. To illustrate an example receiver selection process, reference is now made to FIG. 5 which depicts in flow chart form a receiver selection process 500 that may be performed in cases when the number of receiver antennas equals or exceeds the number of transmitter antennas (e.g. K≥M). Once the procedure starts (step 502), each $UE_{i,j}$ device computes (step 504) its effective direct channel as $h_{i,j}^{eq} = v_{ref}^H G_{i,j}^+ H_{i,j}$ and its effective noise power as $\mathcal{R}_{i,j}^{eff} = E\{|n_{i,j}^{eq}|^2\}$.

At step 506, each $UE_{i,j}$ device computes channel direction information (CDI) and channel quality information (CQI) values, such as the following examples:

$$CDI_{i,j} \triangleq \frac{h_{i,j}^{eq}}{\|h_{i,j}^{eq}\|}, \qquad (20)$$

$$CQI_{i,j} \triangleq \frac{\|h_{i,j}^{eq}\|^2 - \|h_{i,j}^{eq} v_{ref}\|^2}{\mathcal{R}_{i,j}^{eff}}.$$

While each $UE_{i,j}$ device may feed back the computed CDI and CQI values to the corresponding transmitter, it will be appreciated that there might be no need for feeding back $CDI_{i,j}$ in the TDD mode when the transmitters can acquire it from the UL channel.

At decision block 508, it is determined if there is a high load that meets or exceeds a threshold level. This decision may be implemented by comparing the total number of UEs ($N_i$) to a threshold load number ($N_{th}$).

If there is a high user load ($N_i \geq N_{th}$), a pre-configured threshold $\gamma_{th}$ is retrieved or computed at step 510 and used by the transmitter $TX_i$ to construct the following set:

$$\mathcal{S}_i \triangleq \{j | \beta_{i,j} CQI_{i,j} > \gamma_{th}\}, \qquad (21)$$

where $\beta_{i,j}$ denotes the scheduling parameter.

At step 512, the transmitter $TX_i$ sets a counter value l=1 and selects the first UE (denoted $s_l$) as follows:

$$s_l = \arg\max_j \beta_{i,j} CQI_{i,j}. \qquad (22)$$

At step 514, the counter value l is incremented, and at step 516, the transmitter $TX_i$ determines if the counter value exceeds the number of $L_i$ selected UEs.

At step 518, the remaining UEs are selected with an iterative process for so long as the counter value does not exceed $L_i$ (e.g., negative outcome to decision block 516). In step 518, the transmitter $TX_i$ defines the set of previously selected UEs as $\mathcal{S}_{i,l-1} \triangleq \{s_1, \ldots, s_{l-1}\}$. In addition, $\mathcal{P}_{l-1}$ is defined as the sub-space spanned by the CDI vectors of the previously selected UEs, i.e. $\mathcal{P}_{l-1} \triangleq \text{span}(CDI_{i,s_1}, \ldots, CDI_{i,s_{l-1}})$. Finally, for all $j \in \mathcal{S}_i - \mathcal{S}_{i,l-1}$, the transmitter $TX_i$ defines $\mathcal{p}_{i,j}^{(l-1)}$ as the projection of $CDI_{i,j}$ over $\mathcal{P}_{l-1}$, and then selects $$s_l = \arg\min_{j \in S_i - S_{i,l-1}} \|p_{i,j}^{(l-1)}\|^2. \qquad (23)$$

For counter values l=2 to $L_i$, the process is repeated until the counter value exceeds $L_i$ (e.g., affirmative outcome to decision block 516). At this point, the UEs selected for the high user load are identified at step 520 as $(s_1, \ldots, s_{Li})$ and the process ends (step 522).

On the other hand, if it is determined (at decision block 508) that there is a medium or low user load ($N_i < N_{th}$), the transmitter $TX_i$ sets a counter value $l=1$ and selects the first UE (denoted $s_l$) at step 509 as follows:

$$s_l = \arg\max_j \beta_{i,j} CQI_{i,j}. \quad (24)$$

At step 511, the counter value l is incremented, and at step 513, the transmitter $TX_i$ determines if the counter value exceeds the number of $L_i$ selected UEs.

At step 515, the remaining UEs are selected with an iterative process for so long as the counter value does not exceed $L_i$ (e.g., negative outcome to decision block 513). In step 515, the transmitter $TX_i$ defines the set of previously selected UEs as $\mathcal{S}_{l-1} \triangleq \{s_1, \ldots, s_{l-1}\}$. In addition, $\mathcal{P}_{l-1}$ is defined as the sub-space spanned by the CDI vectors of the previously selected UEs, i.e. $\mathcal{P}_{l-1} \triangleq \mathrm{span}(CDI_{i,s_l}, \ldots, CDI_{i,s_{l-1}})$. Finally, for all $j \notin \mathcal{S}_{i,l-1}$, the transmitter $TX_i$ defines $\wp_{i,j}^{(l-1)}$ as the projection of $CDI_{i,j}$ over $\mathcal{P}_{l-1}$, and then selects $$s_l = \arg\max_{j \notin S_{i,l-1}} \beta_{i,j} CQI_{i,j} (1 - \|\wp_{i,j}^{(l-1)}\|^2). \quad (25)$$

For counter values $l=2$ to $L_i$, the process is repeated until the counter value exceeds $L_i$ (e.g., affirmative outcome to decision block 513). At this point, the UEs selected for the medium or low user load are identified at step 520 as $(s_1, \ldots s_{Li})$ and the process ends (step 522).

As described herein, the threshold values $N_{th}$ and $\gamma_{th}$ may be configurable and can be optimized based on the system parameters. By tuning the threshold values, the disclosed selection process chooses UEs having an effective SNR values (approximated by CQI values) that are high enough while maximizing the orthogonality of their equivalent direct channels. While the selection process for a medium or low user load can be used in the high user load case, it will be appreciated that the selection process for a high user load reduces algorithm complexity and the feedback load (in the FDD mode), since only a portion of the users are considered in the scheduling. This helps reducing the feedback load of CQI to just one bit since the UEs just need to send an acknowledgement bit to their affiliated transmitter indicating that whether or not their effective SNR is above the threshold or not and the actual value of CQI is not important.

Figure 6:
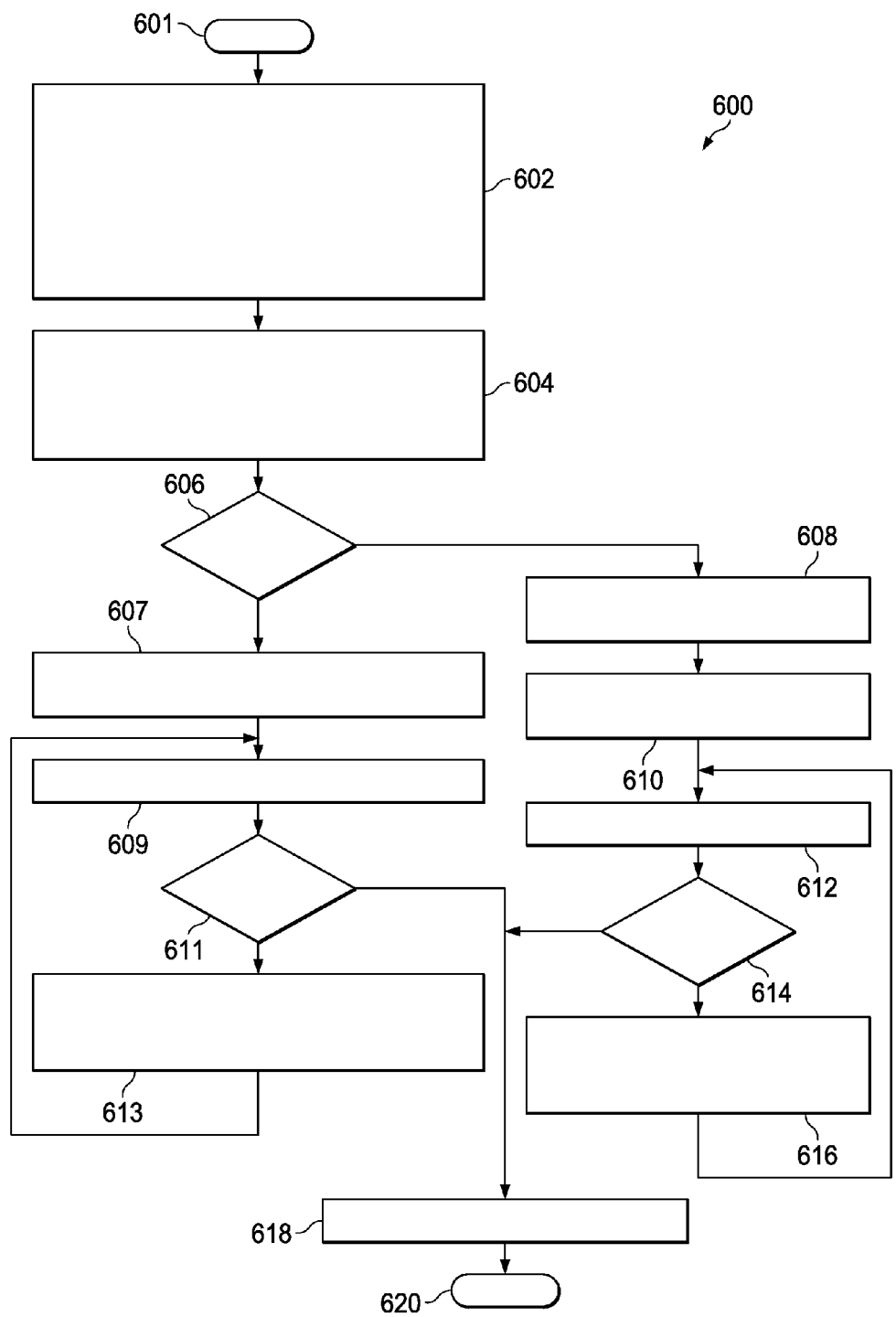
FIG. 6 is a flow chart illustrating a receiver selection process that may be performed to extend the interfering channels in frequency in cases when the number of transmitter antennas exceeds the number of receiver antennas.

Additional receiver scheduling algorithms are disclosed for selecting L, from $N_i$ total number of UEs when the UE antenna count is less than the transmitter antenna count. To illustrate an example receiver selection process for these embodiments, reference is now made to FIG. 6 which depicts in flow chart form a receiver selection process 600 that may be performed to extend the interfering channels in frequency or time in cases when the number of transmitter antennas exceeds the number of receiver antennas (e.g. K<M). Once the procedure starts (step 601), each transmitter device $TX_i$, effectively extends the interfering channels by finding or deriving n1 and n2 (at step 602) that are the smallest integer numbers such that: n1M=n2K (n2>n1). After computing n1 and n2, each transmitter $TX_i$ selects the subcarriers $w_1, \ldots, w_{n2}$ for implementing the proposed scheme and considers the set of $N_i$ UEs that can potentially be considered for the scheduling.

At step 604, each $UE_{i,j}$ device estimates their direct and cross channels, and following Equations (11)-(16), each $UE_{i,j}$ device computes its effective direct channel for each $t_k$ as $h_{i,j}^{eq}(t_k) = v_{ref}^H F_{i,j}^+(t_k) K_{i,j}(t_k)$ and their effective noise power as $\mathfrak{R}_{i,j}^{eff}(t_k) = E\{|n_{i,j}^{eq}(t_k)|^2\}$. In addition, each $UE_{i,j}$ device computes channel direction information (CDI) and channel quality information (CQI) values for each $t_k$ as follows:

$$CDI_{i,j}(t_k) \triangleq \frac{h_{i,j}^{eq}(t_k)}{\|h_{i,j}^{eq}(t_k)\|}, \quad (26)$$

$$CQI_{i,j}(t_k) \triangleq \frac{\|h_{i,j}^{eq}(t_k)\|^2 - |h_{i,j}^{eq}(t_k) v_{ref}|^2}{\mathfrak{R}_{i,j}^{eff}(t_k)}$$

While each $UE_{i,j}$ device may feed back the computed CDI and CQI values to the corresponding transmitter for each $t_k$, it will be appreciated that there might be no need for feeding back $CDI_{i,j}(t_k)$ in the TDD mode when the transmitters can acquire it from the UL channel.

At decision block 606, it is determined if there is a high load that meets or exceeds a threshold level. This decision may be implemented by comparing the total number of UEs ($N_i$) to a threshold load number ($N_{th}$).

If there is a high user load ($N_i \geq N_{th}$), a pre-configured threshold $\gamma_{th}$ is retrieved or computed at step 608 and used by the transmitter $TX_i$ to compute following metric for UE $(i,j)$:

$$q_{i,j} \triangleq \sum_{k=1}^{n1} \beta_{i,j} \log(1 + CQI_{i,j}(t_k)), \quad (27)$$

in which denotes the scheduling parameter. At step 608, the transmitter $TX_i$ also constructs the following set:

$$\mathcal{S}_i \triangleq \{j | q_{i,j} > \gamma_{th}\}. \quad (28)$$

At step 610, the transmitter $TX_i$ sets a counter value $l=1$ and selects the first UE (denoted $s_l$) as follows:

$$s_1 = \arg\max_j q_{i,j}. \quad (29)$$

At step 612, the counter value l is incremented, and at step 614, the transmitter $TX_i$ determines if the counter value exceeds the number of $L_i$ selected UEs.

At step 616, the remaining UEs are selected with an iterative process for so long as the counter value does not exceed $L_i$ (e.g., negative outcome to decision block 614). In step 616, the transmitter $TX_i$ the set of previously selected UEs as $\mathcal{S}_{i,l-1} \triangleq \{s_1, \ldots, s_{l-1}\}$. In addition, the transmitter $TX_i$ defines $\mathcal{P}_{l-1}(t_k) \triangleq \mathrm{span}(CDI_{i,s_l}(t_k), \ldots, CDI_{i,s_{l-1}}(t_k))$. Finally, for all $j \in \mathcal{S}_i \mathcal{S}_{i,l-1}$, the transmitter $TX_i$ defines $\wp_{i,j}^{(l-1)}(t_k)$ as the projection of $CDI_{i,j}(t_k)$ over $\mathcal{P}_{l-1}(t_k)$, and then selects the next UE by computing:

$$s_l = \arg\max_{j \in S_i - S_{i,l-1}} \sum_{k=1}^{n1} \|\wp_{i,j}^{(l-1)}(t_k)\|^2. \quad (30)$$

For counter values $l=2$ to $L_i$, the process is repeated until the counter value exceeds $L_i$ (e.g., affirmative outcome to decision block 614). At this point, the UEs selected for the high user load are identified at step 618 as $(s_1, \ldots s_{Li})$ and the process ends (step 620).

If it is determined (at decision block 606) that there is a medium or low user load ($N_i < N_{th}$), the transmitter $TX_i$ sets a counter value l=1 and selects the first UE (denoted $s_1$) at step 607 as follows:

$$s_1 = \arg\max_j q_{i,j}. \tag{31}$$

At step 609, the counter value l is incremented, and at step 611, the transmitter $TX_i$ determines if the counter value exceeds the number of $L_i$ selected UEs.

At step 613, the remaining UEs are selected with an iterative process for so long as the counter value does not exceed $L_i$ (e.g., negative outcome to decision block 611). In step 615, the transmitter $TX_i$ defines the set of previously selected UEs as $S_{i,l-1} \triangleq \{s_1, \ldots, s_{l-1}\}$. The transmitter also defines $\mathcal{P}_{l-1}(t_k) \triangleq \text{span}(CDI_{i,s_1}(t_k), \ldots, CDI_{i,s_{l-1}}(t_k))$. Finally, for all $j \notin S_{i,l-1}$, the transmitter $TX_i$ defines $\wp_{i,j}^{(l-1)}(t_k)$ as the projection of $CDI_{i,j}(t_k)$ over $\mathcal{P}_{l-1}(t_k)$, and then selects the next UE by computing:

$$s_l = \arg\max_{j \notin S_{i,l-1}} \sum_{k=1}^{n1} \beta_{i,j} \log(1 + CQI_{i,j}(t_k)(1 - \|\wp_{i,j}^{(l-1)}\|^2)). \tag{32}$$

For counter values l=2 to $L_i$, the process is repeated until the counter value exceeds $L_i$ (e.g., affirmative outcome to decision block 611). At this point, the UEs selected for the medium or low user load are identified at step 618 as ($s_1, \ldots s_{Li}$) and the process ends (step 620).

Again, it will be appreciated that threshold parameters $N_{th}$ and $\gamma_{th}$ can be optimized based on the system parameters. The UE selection algorithm proposed for the case of K<M is very similar to the one proposed for the case of K≥M, with the difference that the same set of UEs must be scheduled for all subcarriers $w_1, \ldots, w_{n2}$. As a result, it is possible to select UEs with fairly good channels in all subcarriers for the case of K<M.

In the case where Euclidean Distance Minimization techniques are used to find a combining vector for cases where the UE antenna count K is less than the transmitter antenna count M, the scheduling algorithm can be the same as in the case of K≥M except for the calculation of the CQI value. In particular, since in this case the inter-cell interference cannot be eliminated, CQI may reflect the inter-cell interference for better scheduling performance. For this purpose, CQI for UE (i,j) may be defined as follows:

$$CQI_{i,j} \triangleq \frac{\frac{P_i}{L}(\|h_{i,j}^{eff}\|^2 - |h_{i,j}^{eff} v_{ref}|^2)}{\left(1 - \frac{|v_{ref}^H G_{i,j}^+ G_{i,j} v_{ref}|^2}{\|v_{ref}^H G_{i,j}^+ G_{i,j}\|^2}\right)\frac{P_{3-i}}{M-1} + E\{|n_{i,j}^{eq}|^2\}}, \tag{33}$$

where $h_{i,j}^{eff} = v_{ref}^H G_{i,j}^+ H_{i,j}$. Having CQI defined as above, one may follow the same scheduling algorithm as in the case of K≥M (shown in FIG. 5).

In the interference alignment schemes disclosed herein which use a fixed, globally-known predetermined vector $v_{ref}$, a codebook-based $v_{ref}$ scheme may be used to improve system performance in a way similar to the use of codebooks for precoding matrix information (PMI) in LTE. For example, the predetermined vector $v_{ref}$ may be chosen from the set $\Omega_i = \{v_1, \ldots, v_{Q_i}\}$, where $Q_i = 2^{B_i}$ and $B_i$ is the number of bits for cell i. In selected embodiments, a rotational codebook-based $v_{ref}$ scheme is employed wherein each transmitter $TX_i$ and its associated UEs switch to different vectors in the set $\Omega_i$ based on a pre-determined order or sequence. The order can be cell-specific or the same for all cells, but in either case, no additional signaling is required to tell the UEs which $v_{ref}$ is being used at a certain time since the order is known to all UEs. The rotational codebook-based $v_{ref}$ scheme has the advantage that, when changing $v_{ref}$ after each transmission, a new set of UEs are more likely to be scheduled for the next transmission. In other words, fairness is automatically satisfied among UEs while achieving the same throughput performance as the opportunistic scheduling in the previous section.

In other embodiments, a feedback-based $v_{ref}$ scheme is employed wherein each UE feeds back its favorite choice for $v_{ref}$ by feeding back the corresponding index (similar to the PMI feedback in LTE) to their affiliated transmitter. The UE's favorite choice, for instance for K≥M, can be obtained to maximize the effective SNR by computing $$v_{i,j}^{fav} = \arg\max_{v \in \Omega_i} \frac{\|v^H G_{i,j}^+ H_{i,j}\|^2 - |v^H G_{i,j}^+ H_{i,j} v|^2}{E\{|n_{i,j}^{eq}|^2\}}.$$

Based on the UE count and number of feedback bits, the following situations may occur in cell i, i=1,2 which need to be addressed. First, the transmitter $TX_i$ may not be able to find $L_i$ UEs with the same reported $v_{ref}$. This case mostly corresponds to low UE count (low N) and large $B_i$. To address this situation, each transmitter $TX_i$ can select the UEs considering their reported CQI and favorite choices of $v_{ref}$ such that the selected UEs have fairly high CQI and their reported $v_{ref}$'s have the smallest possible chordal distance to each other. In other embodiments, UEs can feed back multiple choices of $v_{ref}$ to give the transmitter more flexibility for scheduling. For reducing the amount of feedback, each UE may feed back the CQI corresponding to their favorite $v_{ref}$ and a "difference" value ΔCQI with respect to this value. In other embodiments, UEs can feed back their least favorite $v_{ref}$ (along with their favorite one) to their affiliated transmitter as well as the corresponding ΔCQI value. The least favorite $v_{ref}$ can be obtained by computing $$v_{i,j}^{least} = \arg\max_{v \in \Omega_i} \frac{\|v^H G_{i,j}^+ H_{i,j}\|^2 - |v^H G_{i,j}^+ H_{i,j} v|^2}{E\{|n_{i,j}^{eq}|^2\}}.$$

For scheduling, each transmitter $TX_i$ can consider the UEs with CQIs corresponding to the least favorite $v_{ref}$ that are above a certain threshold. After selecting the UEs, transmitter can compute a weighted sum of the reported $v_{ref}$ and report it to the interfering transmitter. UEs can measure the agreed $v_{ref}$ by the pilot signal sent from the interfering transmitter.

Another situation occurs when the transmitter $TX_i$ cannot find $L_i$ UEs with the same reported $v_{ref}$. This case mostly corresponds to high UE count and low number of $B_i$. In specific, this case always happens if $$B_i \leq \log\left(\frac{N_i}{L_i}\right).$$

In this scenario, the same procedure as the fixed $v_{ref}$ scenario can be followed. If more than one set of UEs are found to report the same $v_{ref}$, transmitters can select the ones resulting the best throughput performance (opportunistic scheduling) or other scheduling schemes.

As seen from the foregoing, the disclosed interference alignment techniques provide significant multiplexing gains with good performance and reduced complexity to address interference between two transmitters, each serving the maximum possible number of UEs simultaneously, while only requiring local CSI knowledge at nodes. For example, the disclosed IA schemes provide acceptable performance with local-only or partial CSI assumptions at the transmitters, thereby avoiding the requirement of large feedback overhead that the current LTE cellular networks and even LTE-A cannot handle. In addition, the disclosed IA schemes do not require a large amount of coordination between the nodes that increases dramatically when the number of coordinating nodes increases. And by eliminating the requirement of large global channel feedback, the feedback challenges associated with high mobility scenarios and feedback delay are avoided.

Figure 7:
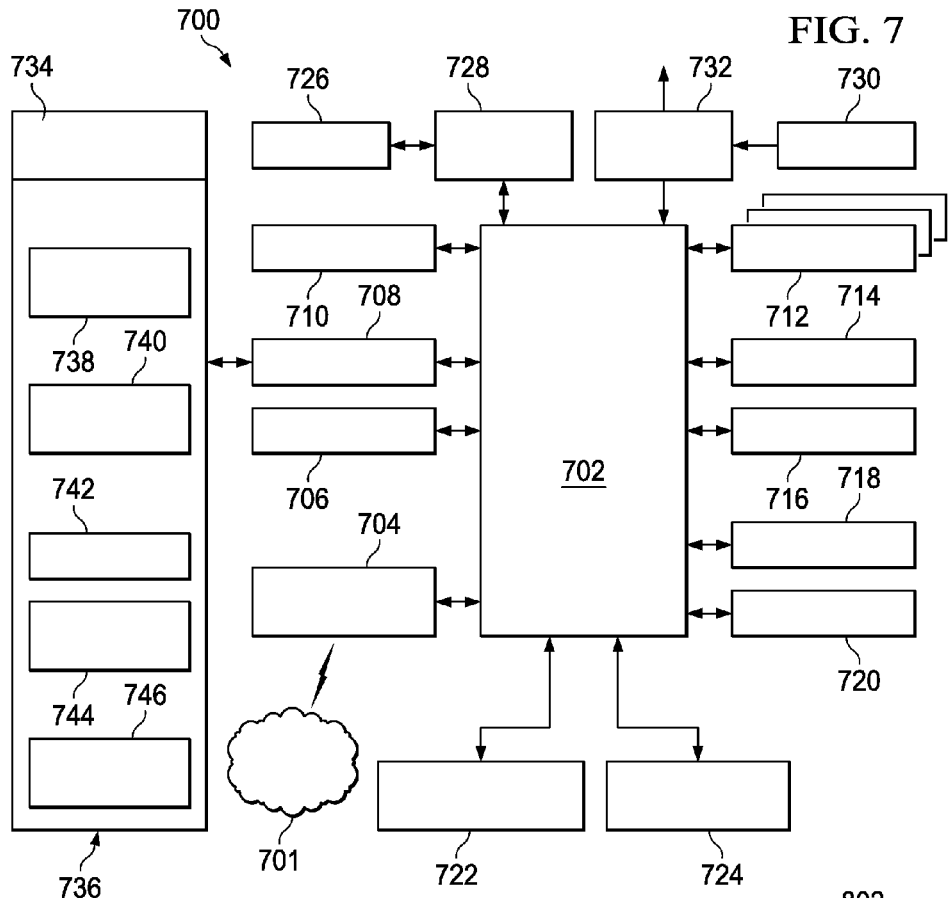
FIG. 7 is a block diagram of a user equipment device.

Referring now to FIG. 7, there is shown a schematic block diagram illustrating exemplary components of a mobile wireless communications or user equipment device 700 which may be used with selected embodiments of the present disclosure. The wireless device 700 is shown with specific components for implementing features described above. It is to be understood that the wireless device 700 is shown with very specific details for exemplary purposes only. As depicted, user equipment 700 includes a number of components such as a main processor 702 that controls the overall operation of user equipment 700. Communication functions, including data and voice communications, are performed through a communication subsystem 704. The communication subsystem 104 receives messages from and sends messages to a wireless network 701. In this illustrative embodiment of user equipment 700, communication subsystem 704 is configured in accordance with the Global System for Mobile Communication (GSM) and General Packet Radio Services (GPRS) standards. The GSM/GPRS wireless network is used worldwide and these standards may be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 704 with the wireless network 701 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 701 associated with user equipment 700 is a GSM/GPRS wireless network in one implementation, other wireless networks may also be associated with user equipment 700 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future generation networks like EDGE, UMTS, WiMAX, LTE and LTE-A. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 702 also interacts with additional subsystems such as a Random Access Memory (RAM) 706, a flash memory 708, a display 710, an auxiliary input/output (I/O) subsystem 712, a data port 714, a keyboard 716, a speaker 718, a microphone 720, short-range communications 722, and other device subsystems 724.

Some of the subsystems of the user equipment 700 perform communication-related functions, whereas other subsystems may provide "resident" or on-device functions. By way of example, the display 710 and the keyboard 716 may be used for both communication-related functions, such as entering a text message for transmission over the network 701, and device-resident functions such as a calculator or task list.

The user equipment 700 can send and receive communication signals over the wireless network 701 after required network registration or activation procedures have been completed. Network access is associated with a subscriber or user of the user equipment 700. To identify a subscriber, the user equipment 700 requires a SIM/RUIM card 726 (i.e. Subscriber Identity Module or a Removable User Identity Module) to be inserted into a SIM/RUIM interface 728 in order to communicate with a network. The SIM card or RUIM 726 is one type of a conventional "smart card" that can be used to identify a subscriber of the user equipment 700 and to personalize the user equipment 700, among other things. Without the SIM card 726, the user equipment 700 is not fully operational for communication with the wireless network 701. By inserting the SIM card/RUIM 726 into the SIM/RUIM interface 728, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 726 includes a processor and memory for storing information. Once the SIM card/RUIM 726 is inserted into the SIM/RUIM interface 728, it is coupled to the main processor 702. In order to identify the subscriber, the SIM card/RUIM 726 can include some user parameters such as an International Mobile Subscriber Identity (IMSI). An advantage of using the SIM card/RUIM 726 is that a subscriber is not necessarily bound by any single physical user equipment. The SIM card/RUIM 726 may store additional subscriber information for user equipment as well, including datebook (or calendar) information and recent call information. Alternatively, user identification information can also be programmed into the flash memory 708.

The user equipment 700 is a battery-powered device and includes a battery interface 732 for receiving one or more rechargeable batteries 730. In at least some embodiments, the battery 730 can be a smart battery with an embedded microprocessor. The battery interface 732 is coupled to a regulator (not shown), which assists the battery 730 in providing power V+ to the user equipment 700. Although current technology makes use of a battery, future technologies such as micro fuel cells may provide the power to the user equipment 700.

The user equipment 700 also includes an operating system 734 and software components 736 which are described in more detail below. The operating system 734 and the software components 736 that are executed by the main processor 702 are typically stored in a persistent store such as the flash memory 708, which may alternatively be a read-only memory (ROM) or similar storage element (not shown). Those skilled in the art will appreciate that portions of the operating system 734 and the software components 736 such as specific device applications, or parts thereof, may be temporarily loaded into a volatile store such as the RAM 706. Other software components can also be included, as is well known to those skilled in the art.

The subset of software components 736 that control basic device operations, including data and voice communication applications, will normally be installed on the user equipment 700 during its manufacture. Other software applications include a message application 738 that can be any suitable software program that allows a user of the user equipment 700 to send and receive electronic messages. Various alternatives exist for the message application 738 as is well known to those skilled in the art. Messages that have been sent or received by the user are typically stored in the random access or flash memory 708 of the user equipment 700 or some other suitable storage element in the user equipment 700. In at least some embodiments, some of the sent and received messages may be stored remotely from the device 700 such as in a data store of an associated host system that the user equipment 700 communicates with.

The software applications can further include a device state module 740, a Personal Information Manager (PIM) 742, and other suitable modules (not shown). The device state module 740 provides persistence, i.e. the device state module 740 ensures that important device data is stored in persistent memory, such as the flash memory 708, so that the data is not lost when the user equipment 700 is turned off or loses power.

The PIM 742 includes functionality for organizing and managing data items of interest to the user, such as, but not limited to, e-mail, contacts, calendar events, voice mails, appointments, and task items. A PIM application has the ability to send and receive data items via the wireless network 701. PIM data items may be seamlessly integrated, synchronized, and updated via the wireless network 701 with the user equipment subscriber's corresponding data items stored or associated with a host computer system. This functionality creates a mirrored host computer on the user equipment 700 with respect to such items. This can be particularly advantageous when the host computer system is the user equipment subscriber's office computer system.

The user equipment 700 also includes a connect module 744, and an IT policy module 746. The connect module 744 implements the communication protocols that are required for the user equipment 700 to communicate with the wireless infrastructure and any host system, such as an enterprise system, that the user equipment 700 is authorized to interface with. Examples of a wireless infrastructure and an enterprise system are given in FIG. 9 described in more detail below.

The connect module 744 includes a set of APIs that can be integrated with the user equipment 700 to allow the user equipment 700 to use any number of services associated with the enterprise system. The connect module 744 allows the user equipment 700 to establish an end-to-end secure, authenticated communication pipe with the host system. A subset of applications for which access is provided by the connect module 744 can be used to pass IT policy commands from the host system to the user equipment 700. This can be done in a wireless or wired manner. These instructions can then be passed to the IT policy module 746 to modify the configuration of the device 700. Alternatively, in some cases, the IT policy update can also be done over a wired connection.

The IT policy module 746 receives IT policy data that encodes the IT policy. The IT policy module 746 then ensures that the IT policy data is authenticated by the user equipment 700. The IT policy data can then be stored in the flash memory 708 in its native form. After the IT policy data is stored, a global notification can be sent by the IT policy module 746 to all of the applications residing on the user equipment 700. Applications for which the IT policy may be applicable then respond by reading the IT policy data to look for IT policy rules that are applicable.

The IT policy module 746 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 746 can determine which applications are affected by the IT policy data and send a notification to only those applications. In either of these cases, for applications that aren't running at the time of the notification, the applications can call the parser or the IT policy module 746 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore, the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 746 sends an acknowledgement back to the host system to indicate that the IT policy data was received and successfully applied.

Other types of software applications can also be installed on the user equipment 700. These software applications can be third party applications, which are added after the manufacture of the user equipment 700. Examples of third party applications include games, calculators, utilities, etc.

The additional applications can be loaded onto the user equipment 700 through at least one of the wireless network 701, the auxiliary I/O subsystem 712, the data port 714, the short-range communications subsystem 722, or any other suitable device subsystem 724. This flexibility in application installation increases the functionality of the user equipment 700 and may provide enhanced on-device functions, communication-related functions, or both. For example, secure communication applications may enable electronic commerce functions and other such financial transactions to be performed using the user equipment 700.

The data port 714 enables a subscriber to set preferences through an external device or software application and extends the capabilities of the user equipment 700 by providing for information or software downloads to the user equipment 700 other than through a wireless communication network. The alternate download path may, for example, be used to load an encryption key onto the user equipment 700 through a direct, and thus reliable and trusted connection, to provide secure device communication.

The data port 714 can be any suitable port that enables data communication between the user equipment 700 and another computing device. The data port 714 can be a serial or a parallel port. In some instances, the data port 714 can be a USB port that includes data lines for data transfer and a supply line that can provide a charging current to charge the battery 730 of the user equipment 700.

The short-range communications subsystem 722 provides for communication between the user equipment 700 and different systems or devices, without the use of the wireless network 701. For example, the subsystem 722 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 704 and input to the main processor 702. The main processor 702 will then process the received signal for output to the display 710 or alternatively to the auxiliary I/O subsystem 712. A subscriber may also compose data items, such as e-mail messages, for example, using the keyboard 716 in conjunction with the display 710 and possibly the auxiliary I/O subsystem 712. The auxiliary subsystem 712 may include devices such as: a touch screen, mouse, track ball, infrared fingerprint detector, or a roller wheel with dynamic button pressing capability. The keyboard 716 is preferably an alphanumeric keyboard or telephone-type keypad. However, other types of keyboards may also be used. A composed item may be transmitted over the wireless network 200 through the communication subsystem 704.

For voice communications, the overall operation of the user equipment 700 is substantially similar, except that the received signals are output to the speaker 718, and signals for transmission are generated by the microphone 720. Alternative voice or audio I/O subsystems, such as a voice message recording subsystem, can also be implemented on the user equipment 700. Although voice or audio signal output is accomplished primarily through the speaker 718, the display 710 can also be used to provide additional information such as the identity of a calling party, duration of a voice call, or other voice call related information.

Figure 8:
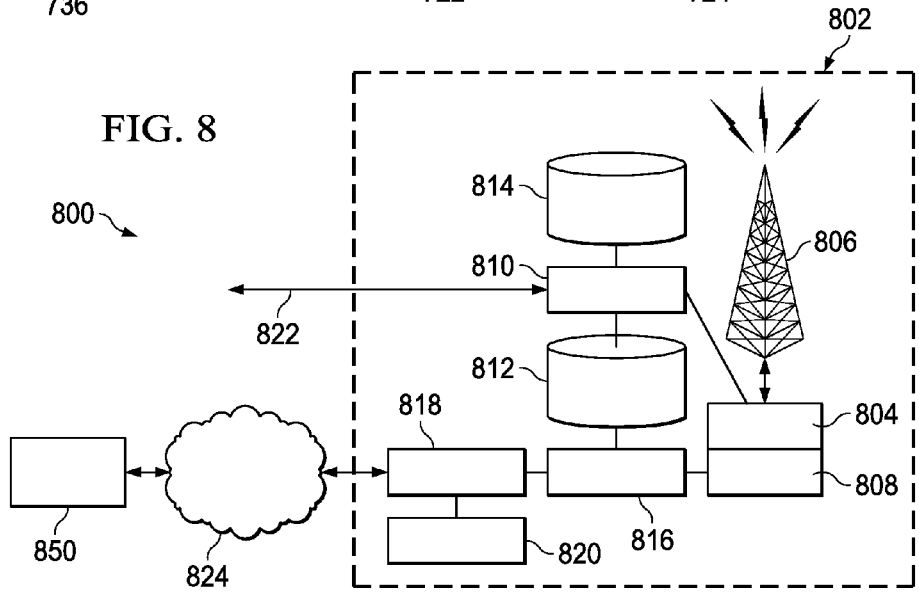
FIG. 8 is a block diagram of a node of a wireless network.

Referring now to FIG. 8, there is depicted a block diagram of an illustrative implementation of a node 802 of the wireless network 701. In practice, the wireless network 701 comprises one or more nodes 802. In conjunction with the connect module 744, the user equipment 700 can communicate with the node 802 within the wireless network 701. In the illustrative implementation 800, the node 802 is configured in accordance with General Packet Radio Service (GPRS) and Global Systems for Mobile (GSM) technologies. However, in other embodiments, node 802 may be configured in accordance with Long Term Evolution (LTE) technology, LTE-Advanced, or IEEE WiMAX. The node 802 includes a base station controller (BSC) 804 with an associated tower station 806, a Packet Control Unit (PCU) 808 added for GPRS support in GSM, a Mobile Switching Center (MSC) 810, a Home Location Register (HLR) 812, a Visitor Location Registry (VLR) 814, a Serving GPRS Support Node (SGSN) 816, a Gateway GPRS Support Node (GGSN) 818, and a Dynamic Host Configuration Protocol (DHCP) 820. This list of components is not meant to be an exhaustive list of the components of every node 802 within a GSM/GPRS network, but rather a list of components that are commonly used in communications through the network 701.

In a GSM network, the MSC 810 is coupled to the BSC 804 and to a landline network, such as a Public Switched Telephone Network (PSTN) 822 to satisfy circuit switched requirements. The connection through the PCU 808, the SGSN 816 and the GGSN 818 to a public or private network (Internet) 824 (also referred to herein generally as a shared network infrastructure) represents the data path for GPRS capable user equipments. In a GSM network extended with GPRS capabilities, the BSC 804 also contains the Packet Control Unit (PCU) 808 that connects to the SGSN 816 to control segmentation, radio channel allocation and to satisfy packet switched requirements. To track the location of the user equipment 700 and availability for both circuit switched and packet switched management, the HLR 812 is shared between the MSC 810 and the SGSN 816. Access to the VLR 814 is controlled by the MSC 810.

The station 806 is a fixed transceiver station and together with the BSC 804 form fixed transceiver equipment. The fixed transceiver equipment provides wireless network coverage for a particular coverage area commonly referred to as a "cell". The fixed transceiver equipment transmits communication signals to, and receives communication signals from, user equipments within its cell via the station 806. The fixed transceiver equipment normally performs such functions as modulation and possibly encoding or encryption of signals to be transmitted to the user equipment 700 in accordance with particular, usually predetermined, communication protocols and parameters, under control of its controller. The fixed transceiver equipment similarly demodulates and possibly decodes and decrypts, if necessary, any communication signals received from the user equipment 700 within its cell. Communication protocols and parameters may vary between different nodes. For example, one node may employ a different modulation scheme and operate at different frequencies than other nodes.

For all user equipment 700 registered with a specific network, permanent configuration data such as a user profile is stored in the HLR 812. The HLR 812 also contains location information for each registered user equipment and can be queried to determine the current location of a user equipment device. The MSC 810 is responsible for a group of location areas and stores the data of the user equipment devices currently in its area of responsibility in the VLR 814. Further, the VLR 814 also contains information on user equipment devices that are visiting other networks. The information in the VLR 814 includes part of the permanent user equipment data transmitted from the HLR 812 to the VLR 814 for faster access. By moving additional information from a remote HLR 812 node to the VLR 814, the amount of traffic between these nodes can be reduced so that voice and data services can be provided with faster response times and at the same time requiring less use of computing resources.

The SGSN 816 and the GGSN 818 are elements added for GPRS support; namely, packet switched data support, within GSM. The SGSN 816 and the MSC 810 have similar responsibilities within the wireless network 701 by keeping track of the location of each user equipment 700. The SGSN 816 also performs security functions and access control for data traffic on the wireless network 701. The GGSN 818 provides internetworking connections with external packet switched networks and connects to one or more SGSN's 816 via an Internet Protocol (IP) backbone network operated within the network 701. During normal operations, a given user equipment 700 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 820 connected to the GGSN 818. There are many mechanisms for dynamic IP assignment, including using a combination of a Remote Authentication Dial-In User Service (RADIUS) server and a DHCP server. Once the GPRS Attach is complete, a logical connection is established from a user equipment 700, through the PCU 808, and the SGSN 816 to an Access Point Node (APN) within the GGSN 818. The APN represents a logical end of an IP tunnel that can either access direct Internet compatible services or private network connections. The APN also represents a security mechanism for the network 701, insofar as each user equipment 700 must be assigned to one or more APNs and user equipments 700 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 701. To maximize use of the PDP Contexts, the network 701 will run an idle timer for each PDP Context to determine if there is a lack of activity. When a user equipment 700 is not using its PDP Context, the PDP Context can be de-allocated and the IP address returned to the IP address pool managed by the DHCP server 820.

By now it should be appreciated that there is disclosed herein a method, apparatus, computer program product, and system for aligning interference at a receiver having K receive antennas caused by first and second transmitters each having M transmit antennas. As disclosed, a receiver assembles a first channel matrix and a second channel matrix for a first affiliated transmitter and a second interfering transmitter, respectively. This information may be assembled by receiving pilot signals from the first affiliated transmitter and the second interfering transmitter, and then determining a direct channel matrix H for the first affiliated transmitter and a cross channel matrix G for the second interfering transmitter based on the pilot signals. The receiver also computes an equivalent direct channel vector from the first and second channel matrices and a predetermined vector $v_{ref}$ having size M, where the predetermined vector is known to the first and second transmitters and to each receiver affiliated with the first and second transmitters. In selected embodiments, the equivalent direct channel vector is determined by computing the inverse of the second channel matrix as $G^+$, computing a complex transpose of the predetermined vector as $v_{ref}^H$, and then computing the equivalent direct channel vector as the product of the first channel matrix, $G^+$, and $v_{ref}^H$. In selected embodiments where the number of receiver antennas is less than the number of transmit antennas (K is less than M), the equivalent direct channel vector may be computed from the first channel matrix H and second channel matrix G by finding a combining vector r which minimizes a Euclidean distance of an equivalent cross channel (rG) to a Hermitian transpose of the predetermined vector if K is less than M, and then computing the equivalent direct channel vector from the product of the combining vector r and the first channel matrix H. In other embodiments where K is less than M, the equivalent direct channel vector may be computed from the first channel matrix H and second channel matrix G by extending the first channel matrix H and second channel matrix G in time or frequency domain to compute an aggregate direct channel matrix and an aggregate cross channel matrix which is invertible with a probability of almost one in a multipath rich propagation environment; and then computing the equivalent direct channel vector from the aggregate direct channel matrix and the aggregate cross channel matrix and the predetermined vector having size M. Once determined, the equivalent direct channel vector may be fed back to the first affiliated transmitter by the receiver. In addition, channel quality indicator information may be fed back from the receiver to the first affiliated transmitter, such as by computing an equivalent noise power indicator at the receiver from the second channel matrix and the predetermined vector, and then feeding back to the first affiliated transmitter an effective noise power indicator that is the power of the equivalent noise vector. Upon receiving single rank data signals from the first transmitter, the receiver applies a combining vector to decode the single rank data signals, where the combining vector is derived from the predetermined vector and the equivalent direct channel vector to project all cross channels from the second transmitter to the predetermined vector to reduce or eliminate interference from the second transmitter. In selected embodiments, the combining vector is applied at the receiver to decode a single rank data signal that is precoded at a transmitter with a precoding vector for each receiver that is computed as a null space of the predetermined vector and an Hermitian of the equivalent direct channel vectors of the rest of the receivers affiliated with the same transmitter.

There is also disclosed herein a transmitter device and method of operation for transmitting one or more signals from a first transmitter having M transmit antennas to one or more single rank receivers affiliated with the first transmitter, where each of the one or more single rank receivers has K receive antennas and receives interference from a second transmitter having M transmit antennas. As disclosed, the transmitter acquires an equivalent direct channel vector from each of the one or more receivers affiliated with the transmitter, where each equivalent direct channel vector is computed at the corresponding receiver from a predetermined vector having size M and first and second channel matrices representing direct and cross channels to the corresponding receiver from the transmitter and a second, interfering transmitter. The predetermined vector is known to the first and second transmitters and to each receiver affiliated with the first and second transmitters. The equivalent direct channel vector may be acquired by receiving a feedback uplink signal from each of the one or more receivers. After selecting a subset of the one or more receivers to receive one or more signals from the transmitter, the transmitter computes and applies, for each receiver in the subset of the one or more receivers, a precoding vector to each single rank signal to be transmitted, where the precoding vector is derived from the predetermined vector and the equivalent direct channel vectors of the rest of affiliated receivers of the same transmitter to reduce or eliminate interference to the receivers receiving signal(s) from the same transmitter or from the other transmitter. The precoding vector for each selected receiver may be computed as the null space of the predetermined vector and an Hermitian transpose of the equivalent direct channel vectors for all other affiliated receivers of the same transmitter, thereby eliminating interference to the receivers receiving signal from the same transmitter or from the other transmitter. In addition, the transmitter transmits a signal $$x_i = \sum_{l=1}^{L_i} p_{i,s_l} u_{i,s_l},$$

where $p_{i,s_l}$ denotes the precoding vector for selected receiver $s_l (l=1, \ldots, L_i)$, where $L_i$ denotes the number of receivers in the selected subset of the one or more receivers, and $u_{i,s_l}$ is the rank-1 data for receiver $s_i$.

In still further embodiments, there is disclosed a user equipment device that is configured to align interference from a cross channel. The disclosed UE device includes an array of K receive antennas for receiving one or more signals over a direct channel from a first transmitter having M transmit antennas and to receive one or more interfering signals over a cross channel from a second transmitter having M transmit antennas. In addition, the disclosed UE device includes a processor that configured to align interference from the one or more interfering signals over the cross channel by first estimating or computing a direct channel matrix and a cross channel matrix for the direct and cross channels, respectively. The UE device also retrieves a predetermined vector having size M from memory, where the predetermined vector is known by the first and second transmitters and by any other user equipment devices affiliated with the first or second transmitters. In addition, the UE device computes a combining vector as a product of an Hermitian of the predetermined vector and an inverse of the cross channel matrix. If the receive antenna count K at the UE device is less than the transmit antenna count M at the transmitter, the processor at the UE may be configured to compute the combining vector by computing a combining vector $$r_{i,j} = \frac{v_{ref}^H G^+}{\|v_{ref}^H G^+ G\|},$$

where $(v_{ref})^H$ is an Hermitian of the predetermined vector, $G^+$ is an inverse of the cross channel matrix, and G is the cross channel matrix. Alternatively, if K is less than M, the processor at the UE may be configured to compute the combining vector by extending the direct channel matrix and cross channel matrix in a time or frequency domain to compute an aggregate direct channel matrix and an aggregate cross channel matrix which are invertible with a probability of almost one in a multipath rich propagation environment, and then computing the combining vector as a product of an Hermitian of the predetermined vector and an inverse of the aggregate cross channel matrix. The combining vector may be fed back to the transmitter along with channel quality indicator information. At the UE device, the CQI may be derived by computing an equivalent noise power indicator as a product of an Hermitian of the predetermined vector and an inverse of the cross channel matrix, and then an effective noise power indicator may be fed back to the transmitter. The UE device also computes an equivalent direct channel matrix as a product of a complex transpose of the predetermined vector and an inverse of the cross channel matrix and the direct channel matrix. Finally, the UE device applies the combining vector to decode one or more single rank data signals received at the user equipment device to project all cross channel signals from the second transmitter to an Hermitian of the predetermined vector to reduce or eliminate interference from the second transmitter.

In yet still further embodiments, computer program product is disclosed that includes a non-transitory computer readable storage medium having computer readable program code embodied therein with instructions which are adapted to be executed to implement a method for operating user equipment (UE) and/or an access device (e.g., radio access network, such as an eNB) to align interference between two transmitter or eNB stations, substantially as described hereinabove. As disclosed, the computer program controls the processor to perform processes at the UE and eNB devices for aligning interference by applying a predetermined vector $v_{ref}$ and channel knowledge H, G from each transmitter at each UE to convert the cross channel interference to the predetermined vector, $v_{ref}$ as a one-dimensional signal and compute and feedback equivalent channel vector information $h_{i,j}^{eq}$ to its affiliated transmitter. With this information, each transmitter selects $L_i$ receivers and constructs a transmitted signal by applying a selected precoding to rank 1 data. In selected embodiments, the computer program is embodied on a computer-readable non-transitory storage medium with program instructions for aligning interference from a cross channel by performing a sequence of steps. In the preliminary step(s), direct and cross channel matrices are estimated for the direct and cross channels to the receiver having K receive antennas from first and second transmitters having M transmit antennas. After retrieving a predetermined vector having size M from memory, where the predetermined vector is known by the first and second transmitters, a combining vector is computed as a product of an Hermitian of the predetermined vector and an inverse of the cross channel matrix, and the combining vector is applied to decode one or more single rank data signals received at the receiver to project all cross channels from the second transmitter to an Hermitian of the predetermined vector to reduce or eliminate interference from the second transmitter. In addition, the computer program is configured to align interference from the cross channel by feeding back to the first transmitter an equivalent direct channel vector which is computed as a product of a complex transpose of the predetermined vector and an inverse of the cross channel matrix and the direct channel matrix.

It should be understood that as used herein, terms such as coupled, connected, electrically connected, in signal communication, and the like may include direct connections between components, indirect connections between components, or both, as would be apparent in the overall context of a particular embodiment. The term coupled is intended to include, but not be limited to, a direct electrical connection.

Numerous modifications and variations of the present application are possible in light of the above teachings. It is therefore to be understood that within the scope of the appended claims, the embodiments of the application may be practiced otherwise than as specifically described herein.

Although the described exemplary embodiments disclosed herein are described with reference to a new downlink multiuser MIMO interference alignment, the present disclosure is not necessarily limited to the example embodiments which illustrate inventive aspects of the present disclosure that are applicable to a wide variety of signaling schemes and applications. Thus, the particular embodiments disclosed above are illustrative only and should not be taken as limitations upon the present disclosure, as the disclosure may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the disclosure as defined by the appended claims so that those skilled in the art should understand that they can make various changes, substitutions and alterations without departing from the spirit and scope of the disclosure in its broadest form.

What is claimed is:
1. A method for aligning interference at a receiver having K receive antennas caused by first and second transmitters each having M transmit antennas, comprising:
assembling at the receiver a first channel matrix and a second channel matrix for a first affiliated transmitter and a second interfering transmitter, respectively;

computing an equivalent direct channel vector from the first and second channel matrices and a predetermined vector having size M; and applying a combining vector to decode single rank data signals received at the receiver, where the combining vector is derived from the predetermined vector and the equivalent direct channel vector to project all cross channels from the second transmitter to the predetermined vector to reduce or eliminate interference from the second transmitter.

2. The method of claim 1, where assembling the first channel matrix and the second channel matrix comprises:
receiving pilot signals from the first affiliated transmitter and the second interfering transmitter; and
determining a direct channel matrix H for the first affiliated transmitter and a cross channel matrix G for the second interfering transmitter based on the pilot signals.

3. The method of claim 1, where computing the equivalent direct channel vector comprises:
computing the inverse of the second channel matrix as $G^+$;
computing a complex transpose of the predetermined vector as $v_{ref}^H$; and
computing the equivalent direct channel vector as the product of the first channel matrix H, the inverse of the second channel matrix as $G^+$, and $v_{ref}^H$.

4. The method of claim 1, further comprising feeding back the equivalent direct channel vector to the first affiliated transmitter.

5. The method of claim 1, where each of the single rank data signals is precoded at a transmitter with a precoding vector for the receiver that is computed as a null space of the predetermined vector and an Hermitian of the equivalent direct channel vectors of a plurality of receivers affiliated with the same transmitter.

6. The method of claim 1, where applying the combining vector effectively aligns all cross channels from the second transmitter to an Hermitian of the predetermined vector.

7. The method of claim 1, where the predetermined vector is known to each of a plurality of receivers affiliated with the first and second transmitters.

8. The method of claim 1, further comprising feeding back channel quality indicator information from the receiver to an affiliated transmitter.

9. The method of claim 1, further comprising:
computing at the receiver an equivalent noise power indicator from the second channel matrix and the predetermined vector; and
feeding back to the first affiliated transmitter an effective noise power indicator.

10. The method of claim 1, where computing the equivalent direct channel vector from the first channel matrix H and second channel matrix G comprises:
finding the combining vector r which minimizes an Euclidean distance of an equivalent cross channel (rG) to an Hermitian of the predetermined vector when K is less than M; and
computing the equivalent direct channel vector from the product of the combining vector r and the first channel matrix H.

11. The method of claim 1, where computing the equivalent direct channel vector from the first channel matrix H and second channel matrix G comprises:
extending the first channel matrix H and second channel matrix G in a time or frequency domain to compute an aggregate direct channel matrix and an aggregate cross channel matrix which are invertible with a probability of almost one in a multipath rich propagation environment; and
computing the equivalent direct channel vector from the aggregate direct channel matrix and the aggregate cross channel matrix and the predetermined vector having size M.

12. A method for transmitting one or more signals from a first transmitter having M transmit antennas to one or more single rank receivers affiliated with the first transmitter, where each of the one or more single rank receivers has K receive antennas and receives interference from a second transmitter having M transmit antennas, comprising:
acquiring at the first transmitter an equivalent direct channel vector from each of the one or more receivers affiliated with the first transmitter, where each equivalent direct channel vector is computed at the corresponding receiver from a predetermined vector having size M and first and second channel matrices representing direct and cross channels to the corresponding receiver from the first and second transmitters, respectively;
selecting a subset of the one or more receivers to receive one or more signals from the first transmitter; and
for each receiver in the subset of the one or more receivers, applying a precoding vector to each single rank signal to be transmitted, where the precoding vector is derived from the predetermined vector and any equivalent direct channel vector from any other receiver affiliated with the first transmitter to reduce or eliminate interference to the receivers receiving signals from the first transmitter or from the second transmitter.

13. The method of claim 12, further comprising:
transmitting a transmit signal $$x_i = \sum_{l=1}^{L_i} p_{i,s_l} u_{i,s_l}$$

to receiver $s_l (l=1, \ldots, L_i)$ in the subset of the one or more receivers, where $p_{i,s_l}$ denotes the precoding vector for selected receiver $s_l$, where $L_i$ denotes the number of receivers in the selected subset of the one or more receivers, and where $u_{i,s_l}$ is the rank-1 data for receiver $s_l$.

14. The method of claim 12, where acquiring the equivalent direct channel vector from each of the one or more receivers comprises receiving the equivalent direct channel vector from each of the one or more receivers in a feedback uplink signal.

15. The method of claim 12, further comprising computing a precoding vector for each selected receiver by computing a null space of the predetermined vector and an Hermitian of any equivalent direct channel vector from any other receiver affiliated with the first transmitter.

16. The method of claim 12, where applying the precoding vector effectively eliminates interference to any receiver receiving a signal from the first transmitter or from the second transmitter.

17. The method of claim 12, where the predetermined vector is known to the first and second transmitters and to each receiver affiliated with the first and second transmitters.

18. A user equipment device configured to align interference from a cross channel, comprising:
an array of K receive antennas configured to receive one or more signals over a direct channel from a first transmitter having M transmit antennas and to receive one or more interfering signals over a cross channel from a second transmitter having M transmit antennas; and a processor configured to align interference from the one or more interfering signals over the cross channel by:

computing a direct channel matrix and a cross channel matrix for the direct and cross channels, respectively;

retrieving a predetermined vector having size M from memory, where the predetermined vector is known by the first and second transmitters and by any other user equipment devices affiliated with the first or second transmitters;

computing a combining vector as a product of an Hermitian of the predetermined vector and an inverse of the cross channel matrix; and applying the combining vector to decode one or more single rank data signals received at the user equipment device to project all cross channel signals from the second transmitter to the Hermitian of the predetermined vector to reduce or eliminate interference from the second transmitter.

19. The user equipment device of claim 18, where the processor is configured to feed back to the first transmitter an equivalent direct channel vector which is computed as a product of an Hermitian of the predetermined vector, an inverse of the cross channel matrix, and the direct channel matrix.

20. The user equipment device of claim 18, where the processor is configured to feed back channel quality indicator information to the first transmitter by:

computing at the user equipment device an equivalent noise power indicator from the cross channel matrix and the predetermined vector; and feeding back to the first transmitter the effective noise power indicator.

21. The user equipment device of claim 18, where the processor is configured to compute the combining vector when K is less than M by computing the combining vector $$r_{i,j} = \frac{v_{ref}^H G^+}{\|v_{ref}^H G^+ G\|},$$

where $v_{ref}^H$ is an Hermitian of the predetermined vector, $G^+$ is an inverse of the cross channel matrix, and G is the cross channel matrix.

22. The user equipment device of claim 18, where the processor is configured to compute the combining vector when K is less than M by:

extending the direct channel matrix and cross channel matrix in a time or frequency domain to compute an aggregate direct channel matrix and an aggregate cross channel matrix which are invertible with a probability of almost one in a multipath rich propagation environment; and computing the combining vector as a product of the Hermitian of the predetermined vector and an inverse of the aggregate cross channel matrix.

* * * * *